United States Patent
Tanaka et al.

(10) Patent No.: US 10,587,607 B2
(45) Date of Patent: Mar. 10, 2020

(54) INFORMATION PROCESSING APPARATUS AND INFORMATION PROCESSING METHOD FOR PUBLIC KEY SCHEME BASED USER AUTHENTICATION

(71) Applicant: Sony Corporation, Tokyo (JP)

(72) Inventors: Yu Tanaka, Tokyo (JP); Taizo Shirai, Kanagawa (JP); Yohei Kawamoto, Tokyo (JP); Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 135 days.

(21) Appl. No.: 15/021,177

(22) PCT Filed: Sep. 11, 2014

(86) PCT No.: PCT/JP2014/074095
§ 371 (c)(1),
(2) Date: Mar. 10, 2016

(87) PCT Pub. No.: WO2015/041139
PCT Pub. Date: Mar. 26, 2015

(65) Prior Publication Data
US 2016/0226856 A1 Aug. 4, 2016

(30) Foreign Application Priority Data

Sep. 19, 2013 (JP) ................. 2013-193995

(51) Int. Cl.
*H04L 29/06* (2006.01)
*G06F 21/31* (2013.01)
*H04L 9/08* (2006.01)
*H04L 9/32* (2006.01)

(52) U.S. Cl.
CPC ............ *H04L 63/083* (2013.01); *G06F 21/31* (2013.01); *H04L 9/088* (2013.01); *H04L 9/3247* (2013.01); *H04L 63/06* (2013.01)

(58) Field of Classification Search
None
See application file for complete search history.

(56) References Cited

U.S. PATENT DOCUMENTS

2001/0034834 A1* 10/2001 Matsuyama .......... H04L 9/3268
713/156
2002/0114468 A1* 8/2002 Nishimura .......... G06Q 20/341
380/270

(Continued)

FOREIGN PATENT DOCUMENTS

| JP | 2001-290912 A | 10/2001 |
|---|---|---|
| JP | 2003-85143 A | 3/2003 |

(Continued)

*Primary Examiner* — William J. Goodchild
(74) *Attorney, Agent, or Firm* — Chip Law Group

(57) ABSTRACT

There is provided an information processing apparatus including a memory that retains a first secret key corresponding to a first public key, and a processor that requests a change of a usage state of a second public key registered by a second apparatus in a first apparatus that retains a public key corresponding to a secret key from the first apparatus according to authentication using the first public key associated with the second public key and the first secret key.

17 Claims, 19 Drawing Sheets

(56) References Cited

U.S. PATENT DOCUMENTS

| | | | |
|---|---|---|---|
| 2003/0041241 A1* | 2/2003 | Saito | H04L 63/0428 |
| | | | 713/169 |
| 2004/0128395 A1* | 7/2004 | Miyazaki | G06F 21/10 |
| | | | 709/229 |
| 2005/0076203 A1* | 4/2005 | Thornton | H04L 63/0823 |
| | | | 713/156 |
| 2005/0120215 A1* | 6/2005 | Lehew | H04L 63/061 |
| | | | 713/171 |
| 2006/0075222 A1* | 4/2006 | Moloney | H04L 63/0823 |
| | | | 713/156 |
| 2006/0150241 A1 | 7/2006 | Huh et al. | |
| 2008/0052539 A1* | 2/2008 | MacMillan | G06F 21/78 |
| | | | 713/193 |
| 2008/0260156 A1* | 10/2008 | Baba | G06F 11/1464 |
| | | | 380/277 |
| 2010/0217975 A1* | 8/2010 | Grajek | G06F 21/445 |
| | | | 713/157 |
| 2010/0269179 A1* | 10/2010 | Fahrny | G06F 21/10 |
| | | | 726/30 |

FOREIGN PATENT DOCUMENTS

| | | |
|---|---|---|
| JP | 2007-166538 A | 6/2007 |
| JP | 2008-42469 A | 2/2008 |
| WO | 2006/018874 A1 | 2/2006 |

* cited by examiner

FIG.9

| KEY | USE SUSPENSION TARGET |
|---|---|
| PKey1 | ✓ |
| PKey2 | ✓ |
| PKey3 | ☐ |
| PKey4 | ✓ |
| PKey5 | ☐ |
| PKey6 | ✓ |

U11　　　　　U12

INFORMATION PROCESSING APPARATUS AND INFORMATION PROCESSING METHOD FOR PUBLIC KEY SCHEME BASED USER AUTHENTICATION

TECHNICAL FIELD

The present disclosure relates to an information processing apparatus, an information processing method, and a computer program.

BACKGROUND ART

With the proliferation of the Internet, the number of online services that provide various services via the Internet is explosively increasing. In online services, users are generally authenticated using passwords. However, as the number of online services to be used increases, users tend to reuse the same password or two or three passwords in a plurality of online services.

When passwords are reused in a plurality of online services, if one password is leaked, there is a vulnerability of damage increasing in a cascade. In recent years, as disclosed in Patent Literature 1, technology in which, even if a password is leaked, the password is not improperly used by others according to two-step authentication and a master password has been disclosed.

CITATION LIST

Patent Literature

Patent Literature 1: JP 2003-85143A

SUMMARY OF INVENTION

Technical Problem

However, even when such technology is used, vulnerability of password authentication is not changed, and efforts for users to manage passwords increase. When a user forgets a password, she or he should ask an operator to reset the password, which results in an increase in labor costs. In the future, it will be necessary to provide a user authentication mechanism that is safer, cheaper, and more convenient, without using password authentication.

In view of the above-described problems, the present disclosure provides an information processing apparatus, an information processing method and a computer program through which a safe and convenient user authentication mechanism is implemented according to a public key authentication scheme.

Solution to Problem

According to the present disclosure, there is provided an information processing apparatus including: a memory configured to retain a first secret key corresponding to a first public key; and a processor configured to request a change of a usage state of a second public key registered by a second apparatus in a first apparatus configured to retain a public key corresponding to a secret key from the first apparatus according to authentication using the first public key associated with the second public key and the first secret key.

According to the present disclosure, there is provided an information processing apparatus including: a memory configured to retain at least a public key out of a pair of a secret key and the public key generated in a first apparatus and a second apparatus; and a processor configured to retain a first public key generated in the first apparatus in the memory in association with a second public key generated in the second apparatus, and change a usage state of the second public key in response to a request to change the usage state of the second public key from the first apparatus.

According to the present disclosure, there is provided an information processing method including the steps of: retaining a first secret key corresponding to a first public key; and requesting a change of a usage state of a second public key registered by a second apparatus in a first apparatus configured to retain a public key corresponding to a secret key from the first apparatus according to authentication using the first public key associated with the second public key and the first secret key.

According to the present disclosure, there is provided an information processing method including the steps of: retaining at least a public key out of a pair of a secret key and the public key generated in a first apparatus and a second apparatus; retaining a first public key generated in the first apparatus in association with a second public key generated in the second apparatus; and changing a usage state of the second public key in response to a request to change the usage state of the second public key from the first apparatus.

According to the present disclosure, there is provided a computer program causing a computer to execute the steps of: retaining a first secret key corresponding to a first public key; and requesting a change of a usage state of a second public key registered by a second apparatus in a first apparatus configured to retain a public key corresponding to a secret key from the first apparatus according to authentication using the first public key associated with the second public key and the first secret key.

According to the present disclosure, there is provided a computer program causing a computer to execute the steps of: retaining at least a public key out of a pair of a secret key and the public key generated in a first apparatus and a second apparatus; retaining a first public key generated in the first apparatus in association with a second public key generated in the second apparatus; and changing a usage state of the second public key in response to a request to change the usage state of the second public key from the first apparatus.

Advantageous Effects of Invention

According to the present disclosure described above, it is possible to provide an information processing apparatus, an information processing method and a computer program through which a safe and convenient user authentication mechanism is implemented according to a public key authentication scheme.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 9 illustrates an exemplary user interface that is output from an output unit 225 of the information processing apparatus 200.

DESCRIPTION OF EMBODIMENTS

Figure 1:
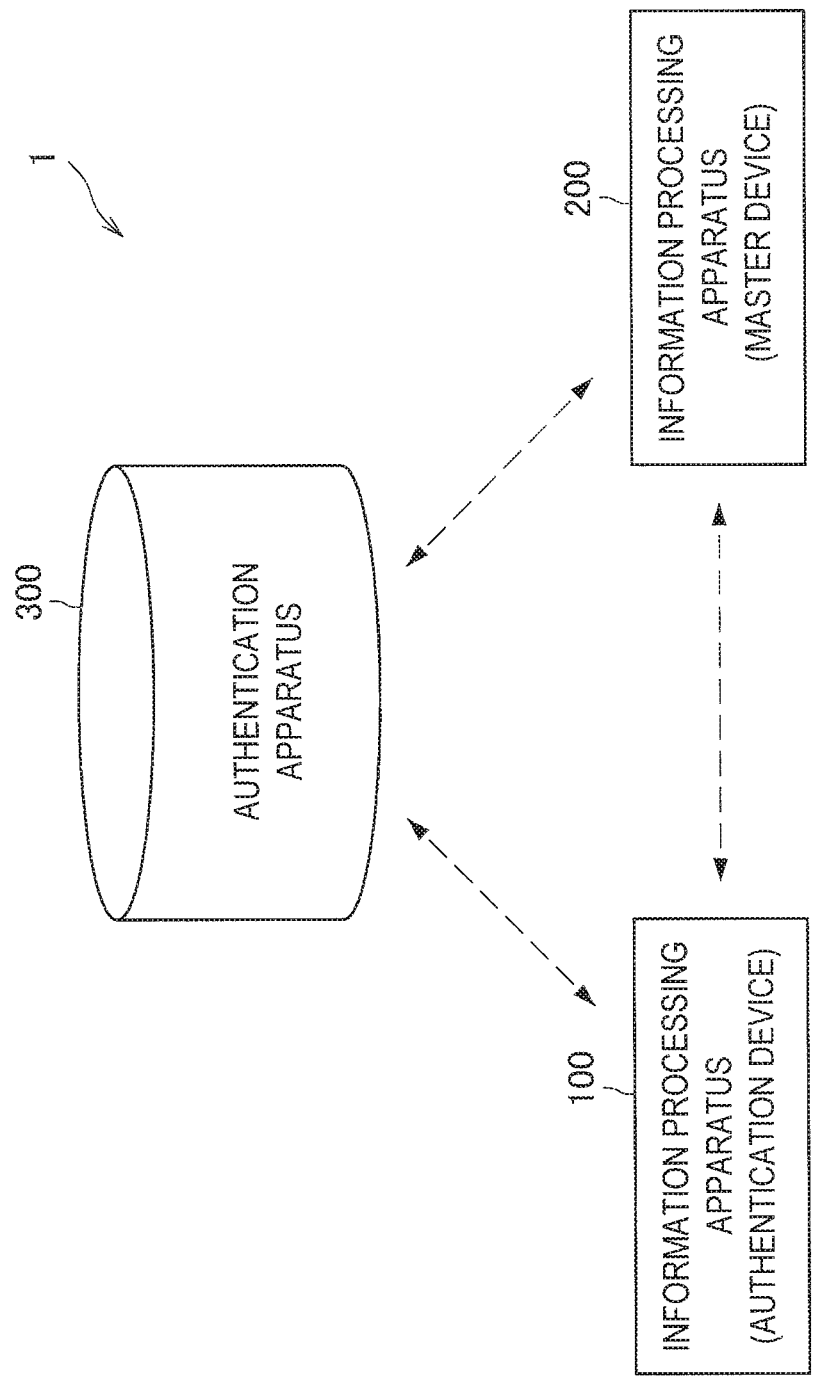
FIG. 1 is an explanatory diagram illustrating an exemplary general configuration of an information processing system 1 according to a first embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. First Embodiment (exemplary association in master device)
1.1. Exemplary System Configuration
1.2. Exemplary functional configuration of authentication apparatus
1.3. Exemplary functional configuration of authentication device
1.4. Exemplary functional configuration of master device
1.5. Description of public key authentication scheme and private key
1.6. Exemplary operations of system
2. Second Embodiment (exemplary association in authentication apparatus)
2.1. Exemplary operations of system
3. Third Embodiment (resumption of use of public key)
3.1. When association is performed in master device
3.2. When association is performed in authentication apparatus
4. Exemplary hardware configuration
5. Conclusion <1. First Embodiment>
[1.1. Exemplary System Configuration]

First, an exemplary general configuration of an information processing system according to the first embodiment of the present disclosure will be described. FIG. 1 is an explanatory diagram illustrating an exemplary general configuration of an information processing system 1 according to the first embodiment of the present disclosure. The exemplary general configuration of the information processing system 1 according to the first embodiment of the present disclosure will be described below with reference to FIG. 1.

As illustrated in FIG. 1, the information processing system 1 according to the first embodiment of the present disclosure includes information processing apparatuses 100 and 200 and an authentication apparatus 300.

Both of the information processing apparatuses 100 and 200 are apparatuses configured to receive authentication from the authentication apparatus 300 according to a public key authentication scheme. The information processing system 1 according to an embodiment of the present disclosure is a system that performs authentication of a user according to the public key authentication scheme and an electronic signature scheme when she or he wants to use a service provided by the authentication apparatus 300.

The information processing apparatuses 100 and 200 are apparatuses configured to generate a pair of keys, a public key PKey and a secret key SKey. Then, when the service provided by the authentication apparatus 300 is used, the information processing apparatuses 100 and 200 transmit only the public key PKey out of the pair of generated keys to the authentication apparatus 300.

In the present embodiment, the information processing apparatus 100 is an apparatus that the user commonly uses. The user receives authentication of the authentication apparatus 300 using the information processing apparatus 100. In the following description, the information processing apparatus 100 configured to receive authentication of the authentication apparatus 300 is referred to as an "authentication device," and the information processing apparatus 200 configured to request a change of a usage state of the public key PKey of the information processing apparatus 100 from the authentication apparatus 300 is referred to as a "master device."

The information processing apparatuses 100 and 200 may have the form of personal computers (PCs), smartphones (high-functioning mobile phones), tablet type portable terminals, portable music players, portable game machines, and wearable devices of a wristwatch type or a glasses type. In particular, the information processing apparatus 100 serving as the authentication device may be a device that the user possesses and uses, for example, a smartphone (a high-functioning mobile phone), a tablet type portable terminal, a portable music player, and a portable game machine. In addition, the authentication apparatus 300 may have the form of a server apparatus, a PC or the like.

The service provided by the authentication apparatus 300 includes, for example, a social networking service (SNS) and an online storage service. In addition, when the authentication apparatus 300 is the PC, login to the PC may be included in the service provided by the authentication apparatus 300. When the user of the information processing apparatus 100 uses the service provided by the authentication apparatus 300, the public key generated in the information processing apparatus 100 is transmitted to the authentication apparatus 300, and authentication of the authentication apparatus 300 according to the public key authentication scheme is received.

When the authentication of the authentication apparatus 300 according to the public key authentication scheme is received, the user saves the time of inputting an ID and a password, and there is no need to remember a password. In addition, since the authentication is received according to the public key authentication scheme, the information processing system 1 has no risk of password leakage and keeps robust security compared to a password authentication scheme.

However, when the user of the information processing apparatus 100 has lost the information processing apparatus 100, there is a risk of the public key registered in the authentication apparatus 300 being used by another user who has found the information processing apparatus 100. For this reason, when reception of authentication of the authentication apparatus 300 using the information processing apparatus 100 is not possible because, for example, the user of the information processing apparatus 100 has lost the information processing apparatus 100, it is highly preferable to immediately set the public key registered in the authentication apparatus 300 to a use suspension state.

Therefore, in the present embodiment, for example, when reception of authentication of the authentication apparatus 300 using the information processing apparatus 100 is not possible because, for example, the user has lost the information processing apparatus 100, the information processing apparatus 200 serving as the master device requests suspension of use of the public key PKey generated in the information processing apparatus 100 or resumption of use of the public key PKey of which use is suspended from the authentication apparatus 300.

In the present embodiment, the information processing apparatus 200 serving as the master device manages the public key generated by the information processing apparatus 100 in association with the public key generated by the information processing apparatus 200. Therefore, the information processing apparatus 200 requests a change of a usage state of the public key generated by the information processing apparatus 100 from the authentication apparatus 300. When the information processing apparatus 200 requests the change of the usage state of the public key generated by the information processing apparatus 100, for example, as described above, if the user has lost the information processing apparatus 100 serving as the authentication device, reception of authentication of the authentication apparatus 300 using the information processing apparatus 100 is disabled in some cases.

The information processing apparatuses 100 and 200 may be possessed by the same user or possessed by different users. When different users possess the information processing apparatuses 100 and 200, it is more preferable that a user who possesses the information processing apparatus 200 serving as the master device be a user on whom the other user who possesses the information processing apparatus 100 serving as the authentication device can rely (for example, her or his father or mother). In addition, it is more preferable that the information processing apparatus 200 serving as the master device be stored in a safe place in a house from which it is not often moved.

The authentication apparatus 300 is an apparatus configured to authenticate the information processing apparatuses 100 and 200. Specifically, the authentication apparatus 300 retains the public key PKey generated by the information processing apparatuses 100 and 200, performs a public key authentication protocol with the information processing apparatuses 100 and 200, and authenticates that the information processing apparatuses 100 and 200 retain the secret key SKey corresponding to the retained public key PKey.

Therefore, in the present embodiment, the authentication apparatus 300 changes the usage state of the public key generated by the information processing apparatus 100 in association with the public key generated by the information processing apparatus 200 in response to the request from the information processing apparatus 200 serving as the master device. The change of the usage state of the public key generated by the information processing apparatus 100 includes suspension of use of the public key and resumption of use of the public key of which use is suspended.

When the information processing system 1 according to the first embodiment of the present disclosure has the configuration illustrated in FIG. 1, the authentication apparatus 300 can change the usage state of the public key generated by the information processing apparatus 100.

The exemplary general configuration of the information processing system 1 according to the first embodiment of the present disclosure has been described above with reference to FIG. 1. Next, an exemplary functional configuration of apparatuses of the information processing system 1 according to the first embodiment of the present disclosure will be described.

[1.2. Exemplary Functional Configuration of Authentication Apparatus]

Figure 2:
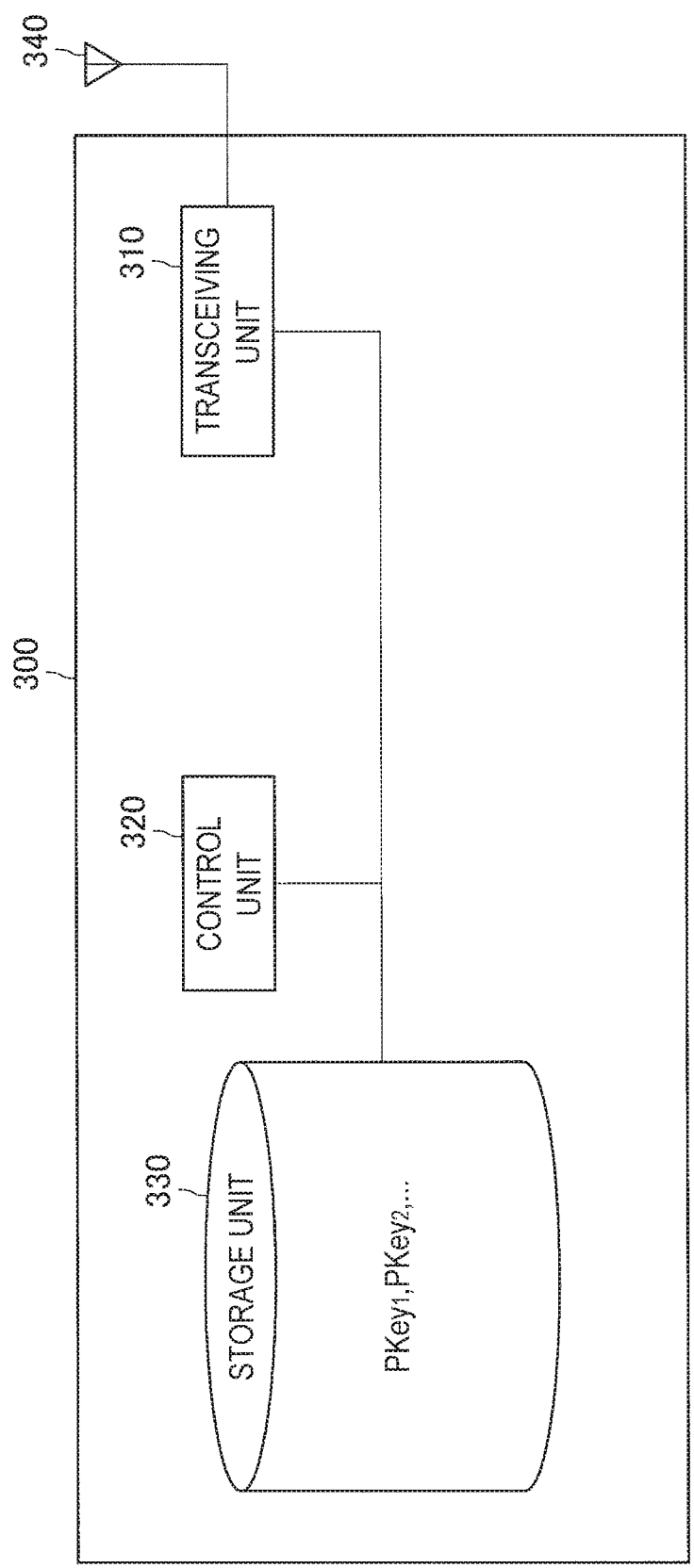
FIG. 2 is an explanatory diagram illustrating an exemplary functional configuration of an authentication apparatus 300 according to the first embodiment of the present disclosure.

FIG. 2 is an explanatory diagram illustrating an exemplary functional configuration of the authentication apparatus 300 according to the first embodiment of the present disclosure. The exemplary functional configuration of the authentication apparatus 300 according to the first embodiment of the present disclosure will be described below with reference to FIG. 2.

As illustrated in FIG. 2, the authentication apparatus 300 according to the first embodiment of the present disclosure includes a transceiving unit 310, a control unit 320, a storage unit 330, and a communication unit 340.

The transceiving unit 310 performs a receiving process of data that is received by the communication unit 340 from another apparatus and a transmitting process of data to be transmitted from the communication unit 340 to the other apparatus. The transceiving unit 310 may perform, for example, a demodulating process, an A/D converting process, and an error correcting process, as the receiving process, and perform, for example, a D/A converting process and a modulating process, as the transmitting process.

The control unit 320 controls operations of the authentication apparatus 300. In the present embodiment, the control unit 320 performs various protocols with the information processing apparatuses 100 and 200 through, for example, the transceiving unit 310, and may perform management of the public key such as storing the public key generated by the information processing apparatuses 100 and 200 in the storage unit 330 and changing the usage state of the public key generated by the information processing apparatus 100.

Figure 3:
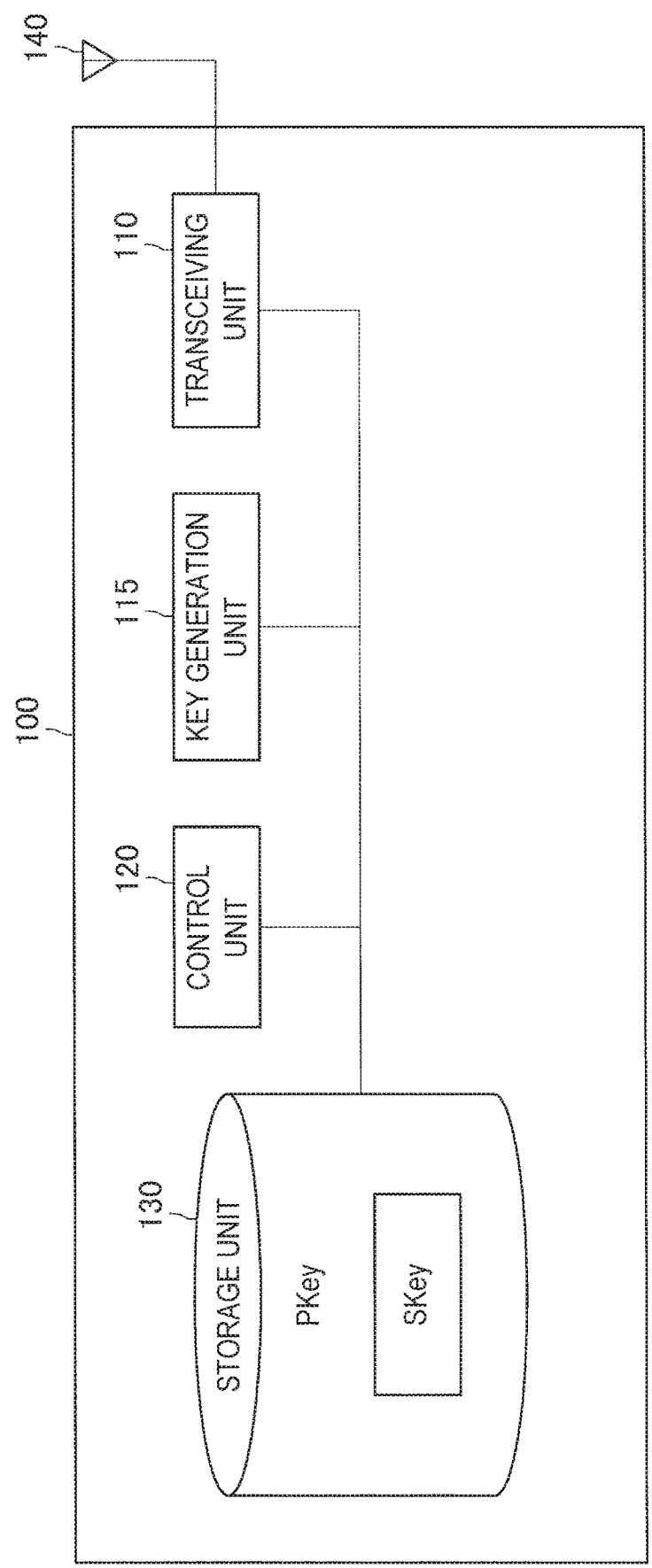
FIG. 3 is an explanatory diagram illustrating an exemplary functional configuration of an information processing apparatus 100 (an authentication device) according to the first embodiment of the present disclosure.

The storage unit 330 is a storage area in which various types of data are stored. In the present embodiment, the storage unit 330 retains the public key generated by the information processing apparatuses 100 and 200. In addition, the storage unit 330 retains information on the usage state of the public key generated by the information processing apparatus 100. The storage unit 330 may also retain a computer program that is read and executed by the control unit 320. In FIG. 3, $PKey_1$, $PKey_2$, ... represent public keys generated by the information processing apparatuses 100 and 200.

The communication unit 340 performs communication with another apparatus, and particularly with the information processing apparatuses 100 and 200 via a network. Communication of the authentication apparatus 300 with the information processing apparatuses 100 and 200 may be performed in either a wired or wireless manner. In FIG. 2, while the communication unit 340 in the form of an antenna configured to perform wireless communication is illustrated, the communication unit 340 is not limited thereto.

The exemplary functional configuration of the authentication apparatus 300 according to the first embodiment of the present disclosure has been described above with reference to FIG. 2. Next, an exemplary functional configuration of the information processing apparatus 100 (the authentication device) according to the first embodiment of the present disclosure will be described.

[1.3. Exemplary Functional Configuration of Authentication Device]

FIG. 3 is an explanatory diagram illustrating an exemplary functional configuration of the information processing apparatus 100 (the authentication device) according to the first embodiment of the present disclosure. The exemplary functional configuration of the information processing apparatus 100 according to the first embodiment of the present disclosure will be described below with reference to FIG. 3.

As illustrated in FIG. 3, the information processing apparatus 100 according to the first embodiment of the present disclosure includes a transceiving unit 110, a key generation unit 115, a control unit 120, a storage unit 130, and a communication unit 140.

The transceiving unit 110 performs a receiving process of data that is received by the communication unit 140 from another apparatus and a transmitting process of data to be transmitted from the communication unit 140 to the other apparatus. The transceiving unit 110 may perform, for example, a demodulating process, an A/D converting process, and an error correcting process as the receiving process, and perform, for example, a D/A converting process and a modulating process as the transmitting process.

The key generation unit 115 generates a pair of keys, a public key and a secret key. In the embodiment, a public key authentication scheme is not limited to a specific scheme. For example, the public key authentication scheme may use RSA cryptography or may use elliptic curve cryptography. Also, as will be described below in detail, a public key authentication scheme using multi-order multivariate simultaneous equations that are difficult to solve as a basis for security may be used, as disclosed in, for example, JP 2012-98690A.

The control unit 120 controls operations of the information processing apparatus 100. In the present embodiment, the control unit 120 may perform various protocols with the information processing apparatus 200 and the authentication apparatus 300 through, for example, the transceiving unit 110, and store the public key and secret key generated by the key generation unit 115 in the storage unit 130.

The storage unit 130 is a storage area in which various types of data are stored. In the present embodiment, the storage unit 130 retains the public key and secret key generated by the key generation unit 115. The storage unit 130 may also retain a computer program that is read and executed by the control unit 120. In FIG. 3, a PKey and an SKey represent the public key and the secret key that are generated by the key generation unit 115.

Also, it is preferable that at least one area of the storage unit 130 have a tamper-resistant property. The secret key generated by the key generation unit 115 is preferably stored in the area having the tamper-resistant property. As will be described below, since the secret key is a key for proving validity of the public key generated thereby, leakage of the secret key should be avoided.

The communication unit 140 performs communication with another apparatus, and particularly with the information processing apparatus 200 and the authentication apparatus 300 via a network. Communication of the information processing apparatus 100 with the information processing apparatus 200 and the authentication apparatus 300 is performed in either a wired or wireless manner. In FIG. 3, while the communication unit 140 in the form of an antenna configured to perform wireless communication is illustrated, the communication unit 140 is not limited thereto.

Note that communication between the information processing apparatus 100 and the authentication apparatus 300 may be directly performed or performed through another apparatus.

The exemplary functional configuration of the information processing apparatus 100 (the authentication device) according to the first embodiment of the present disclosure has been described above. Next, an exemplary functional configuration of the information processing apparatus 200 (the master device) according to the first embodiment of the present disclosure will be described.

[1.4. Exemplary Functional Configuration of Master Device]

Figure 4:
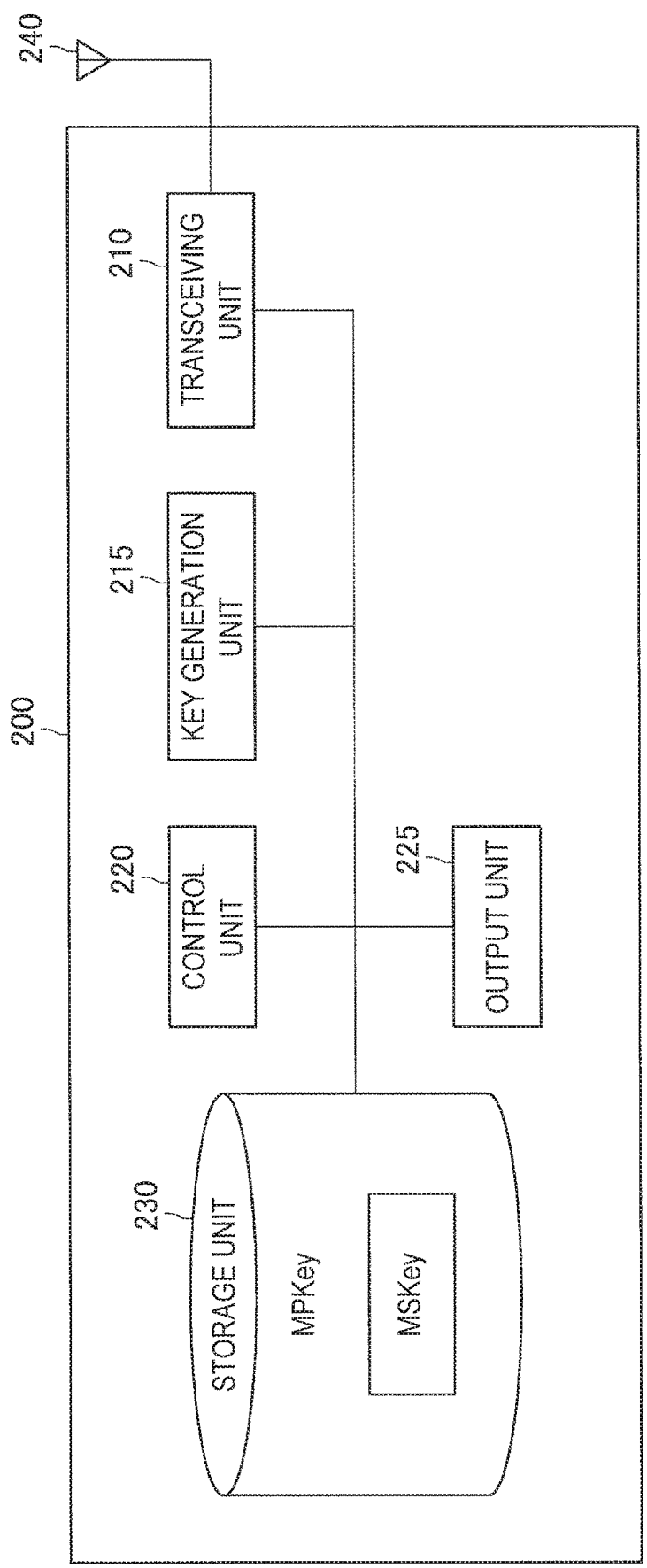
FIG. 4 is an explanatory diagram illustrating an exemplary functional configuration of an information processing apparatus 200 (a master device) according to the first embodiment of the present disclosure.

FIG. 4 is an explanatory diagram illustrating an exemplary functional configuration of the information processing apparatus 200 (the master device) according to the first embodiment of the present disclosure. The exemplary functional configuration of the information processing apparatus 200 according to the first embodiment of the present disclosure will be described below with reference to FIG. 4.

As illustrated in FIG. 4, the information processing apparatus 200 according to the first embodiment of the present disclosure includes a transceiving unit 210, a key generation unit 215, a control unit 220, an output unit 225, a storage unit 230, and a communication unit 240.

The transceiving unit 210 performs a receiving process of data that is received by the communication unit 240 from another apparatus and a transmitting process of data to be transmitted from the communication unit 240 to the other apparatus. The transceiving unit 110 may perform, for example, a demodulating process, an A/D converting process, and an error correcting process as the receiving process, and perform, for example, a D/A converting process and a modulating process as the transmitting process.

The key generation unit 215 generates a pair of keys, a public key and a secret key. In the embodiment, a public key authentication scheme is not limited to a specific scheme. For example, the public key authentication scheme may use RSA cryptography or may use elliptic curve cryptography. Also, as will be described below in detail, a public key authentication scheme using multi-order multivariate simultaneous equations that are difficult to solve as a basis for security may be used, as disclosed in, for example, JP 2012-98690A.

The control unit 220 controls operations of the information processing apparatus 200. In the present embodiment, the control unit 220 may perform various protocols with the information processing apparatus 100 and the authentication apparatus 300 through, for example, the transceiving unit 210, and store the public key and secret key generated by the key generation unit 215 in the storage unit 230.

The output unit 225 outputs various types of information. For example, the output unit 225 may be a display device such as a liquid crystal display panel and an organic EL display panel or may be an interface configured to display information on a display device such as a liquid crystal display panel and an organic EL display panel outside the information processing apparatus 200.

The storage unit 230 is a storage area in which various types of data are stored. In the present embodiment, the storage unit 230 retains the public key and secret key generated by the key generation unit 215. The storage unit 230 may also retain a computer program that is read and executed by the control unit 220. In FIG. 4, an MPKey and an MSKey represent the public key and the secret key that are generated by the key generation unit 215.

Therefore, the storage unit 230 retains a state in which the public key PKey generated by the key generation unit 115 of the information processing apparatus 100 is associated with the public key MPKey generated by the key generation unit 215 of the information processing apparatus 200. A method of associating the public key PKey with the public key MPKey will be described below in detail.

Also, it is preferable that at least one area of the storage unit 230 have a tamper-resistant property. The secret key generated by the key generation unit 215 is preferably stored in the area having the tamper-resistant property. As will be described below, since the secret key is a key for proving validity of the public key generated thereby, leakage of the secret key should be avoided.

The communication unit 240 performs communication with another apparatus, and particularly with the information processing apparatus 100 and the authentication apparatus 300 via a network. Communication of the information processing apparatus 200 with the information processing apparatus 100 and the authentication apparatus 300 is performed in either a wired or wireless manner. In FIG. 4, while the communication unit 240 in the form of an antenna configured to perform wireless communication is illustrated, the communication unit 240 is not limited thereto.

Note that communication between the information processing apparatus 200 and the authentication apparatus 300 may be directly performed or performed through another apparatus.

The exemplary functional configuration of the information processing apparatus 200 (the master device) according to the first embodiment of the present disclosure has been described above.

[1.5. Description of Public Key Authentication Scheme and Secret Key]

Next, the public key authentication scheme and the secret key will be described. The public key authentication scheme is an authentication scheme in which a certain person (prover) convinces another person (verifier) of her or his identity using the public key pk and the secret key sk. For example, a public key $pk_A$ of a prover A is published to a verifier. On the other hand, a secret key $sk_A$ of the prover A is managed secretly by the prover. According to the public key authentication scheme, a person who knows the secret key $sk_A$ corresponding to the public key $pk_A$ is regarded as the prover A herself or himself.

When the prover A proves her or his identity to a verifier B, the prover A may perform an interactive protocol with the verifier B and prove that she or he knows the secret key $sk_A$ corresponding to the public key $pk_A$. Furthermore, when the fact that the prover A knows the secret key skA is proved to the verifier B according to the interactive protocol, validity (identity) of the prover A is proved.

Also, the following two conditions are necessary in order to ensure security of the public key authentication scheme.

The first condition is a condition that probability of falsification being established by a falsifier having no secret key sk be as small as possible when an interactive protocol is performed. The fact that the first condition is established is called "soundness." That is, in an interactive protocol having soundness, it can be otherwise said that there is no case in which falsification is established at a non-negligible probability by a falsifier having no secret key sk. The second condition is a condition that information regarding the secret key $sk_A$ possessed by the prover A not leak to the verifier B even when an interactive protocol is performed. The fact that the second condition is established is called a "zero-knowledge property."

By using an interactive protocol having the soundness and the zero-knowledge property described above, the security of the public key authentication scheme is ensured.

Figure 18:
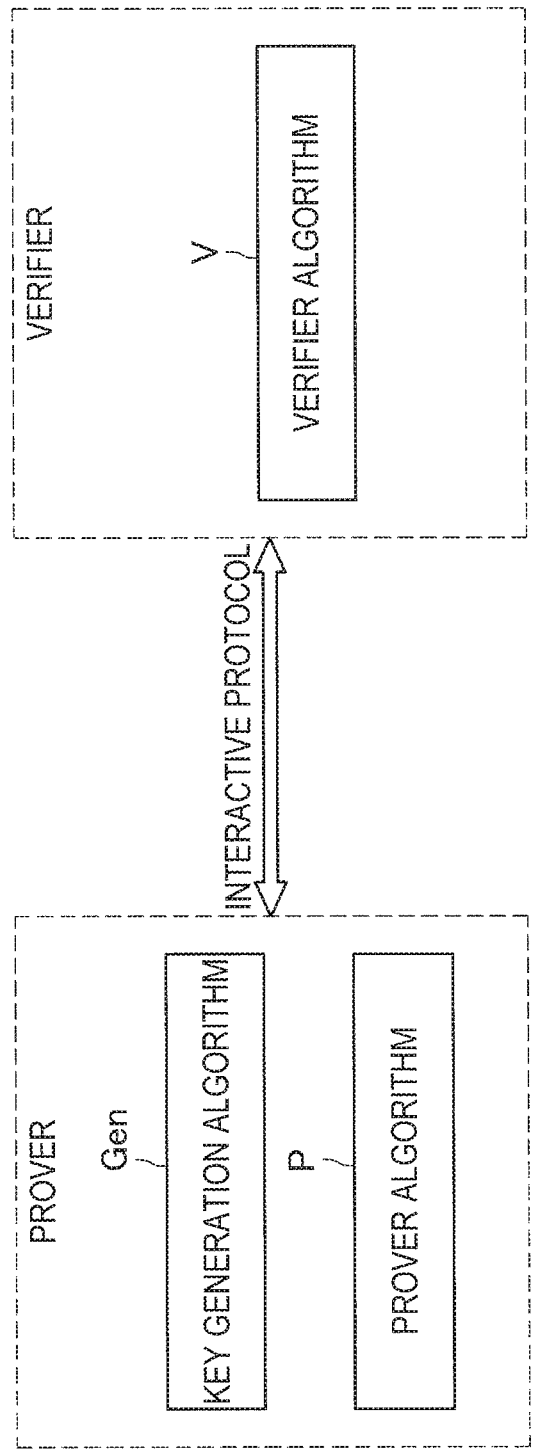
FIG. 18 is an explanatory diagram for describing a configuration of an algorithm according to a public key authentication scheme.

In a model of the public key authentication scheme, two entities, namely a prover and a verifier, are present, as shown in FIG. 18. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk is used to prove to the verifier of possession of the secret key sk corresponding to the public key pk by the prover. Formally, the key generation algorithm Gen is represented as formula (1) below as an algorithm that takes security parameter $1^\lambda$ ($\lambda$, is an integer of 0 or more) as an input and outputs the secret key sk and the public key pk.
[Math. 1]

$$(sk, pk) \leftarrow \text{Gen}(1^\lambda) \qquad (1)$$

(Prover Algorithm P)

The prover algorithm P is used by the prover. Furthermore, the prover algorithm P is an algorithm for proving that the prover possesses the secret key sk corresponding to the public key pk. The prover algorithm P is defined as an algorithm that takes the secret key sk and the public key pk of the prover as inputs and performs an interactive protocol with the verifier.

(Verifier algorithm V)

The verifier algorithm V is used by a verifier. Furthermore, the prover algorithm V is an algorithm for verifying whether or not the prover possesses the secret key sk corresponding to the public key pk in an interactive protocol. The verifier algorithm V is defined as an algorithm that takes the public key pk of the prover as an input, and performs the interactive protocol with the prover, and subsequently outputs 0 or 1 (1 bit). Furthermore, the prover is assumed to be invalid when the output is 0 and the prover is assumed to be valid when the output is 1. Formally, the verifier algorithm V is represented as formula (2) below.
[Math. 2]

$$0/1 \leftarrow V(pk) \qquad (2)$$

As described above, in the public key authentication scheme, it is necessary to satisfy the two conditions, i.e., the soundness and the zero-knowledge property, in order to ensure security. However, in order to prove to the verifier that the prover possesses the secret key sk, it is necessary for the prover to perform a procedure dependent on the secret key sk, notify the prover of the result, and cause the verifier to perform verification based on the notification content. It is necessary to perform the procedure dependent on the secret key sk in order to guarantee the soundness. Meanwhile, even when the verifier is notified of the result of the procedure, it is necessary not to leak information regarding the secret key sk to the verifier at all. Therefore, it is necessary to design the key generation algorithm Gen, the prover algorithm P, and the verifier algorithm V described above so that such requisites are satisfied.

Figure 19:
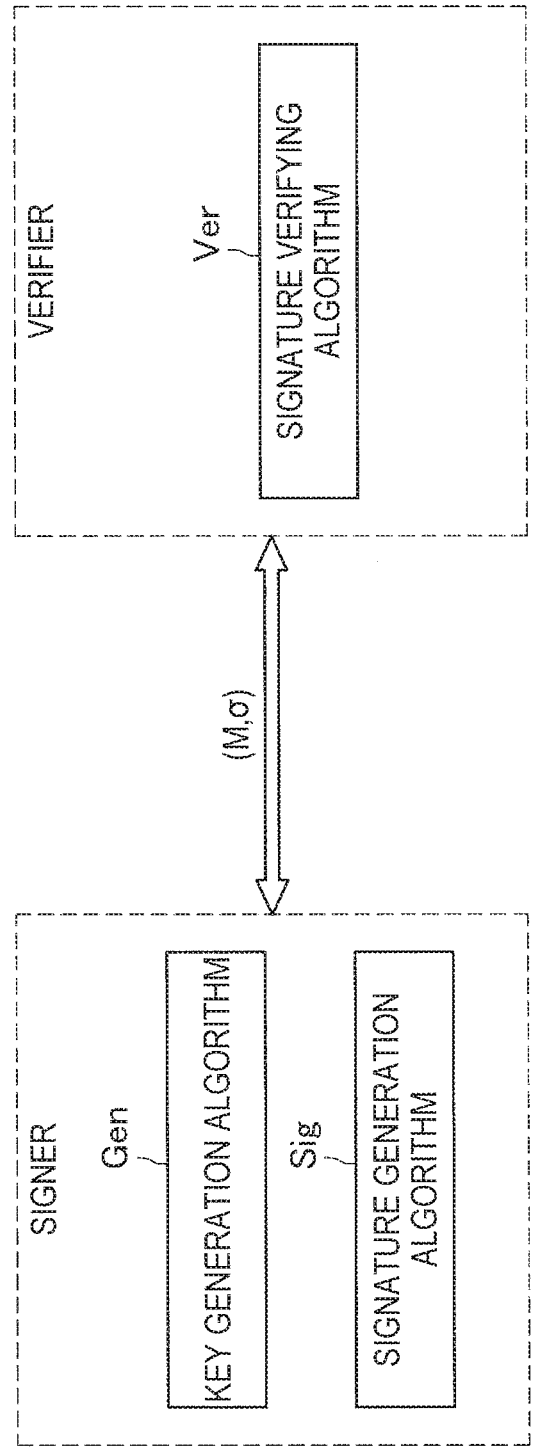
FIG. 19 is an explanatory diagram for describing a configuration of an algorithm according to an electronic signature scheme.

Next, algorithms for a digital signature scheme will be summarized. FIG. 19 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 19, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature σ to attach to a message M. In other words, the signer is an entity that attaches a digital signature σ to a message M. Meanwhile, the verifier uses the signature verifying algorithm Ver to verify the digital signature attached to the message M. In other words, the verifier is an entity that verifies the digital signature σ in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature σ to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).
[Math. 3]

$$(sk, pk) \leftarrow \text{Gen}(1^\lambda) \qquad (3)$$

(Signature Generation Algorithm Sig)

The signature generation algorithm Sig is used by the signer. The signature generation algorithm Sig is an algorithm that generates a digital signature σ to be attached to a message M. The signature generation algorithm Sig is an algorithm that accepts a signature key sk and a message M as input, and outputs a digital signature σ. The signature generation algorithm Sig may be expressed formally as in the following formula (4).
[Math. 4]

$$\sigma \leftarrow \text{Sig}(sk, M) \qquad (4)$$

(Signature Verifying Algorithm Ver)

The signature verifying algorithm Ver is used by the verifier. The signature verifying algorithm Ver is an algorithm that verifies whether or not the digital signature σ is a valid digital signature for the message M. The signature verifying algorithm Ver is an algorithm that accepts a signer's verification key pk, a message M, and a digital signature σ as input, and outputs 0 or 1 (1 bit). The signature verifying algorithm Ver may be expressed formally as in the following formula (5). At this point, the verifier decides that the digital signature σ is invalid in the case where the signature verifying algorithm Ver outputs 0 (the case where the verification key pk rejects the message M and the digital signature σ), and decides that the digital signature σ is valid in the case where the signature verifying algorithm Ver outputs 1 (the case where the verification key pk accepts the message M and the digital signature σ).
[Math. 5]

$$0/1 \leftarrow \mathrm{Ver}(pk, M, \sigma) \quad (5)$$

In the present disclosure, neither the public key authentication scheme nor the digital signature scheme is limited to a specific scheme. For example, the public key authentication scheme or the digital signature scheme may use RSA cryptography or may use elliptic curve cryptography. Also, the public key authentication scheme or the digital signature scheme using multi-order multivariate simultaneous equations that are difficult to solve as a basis for security may be used, as disclosed in, for example, JP 2012-98690A. The function used in the foregoing document is a function formed by m n-variable quadratic polynomials (where both of m and n are integers of 2 or more).

For example, in order to ensure 80-bit security, a key length of 1024 bits is necessary in the case of the RSA cryptography and a key length of 160 bits is necessary even in the case of ECDSA. Meanwhile, in the above-described case of the public key authentication scheme using multi-order multivariate simultaneous equations that are difficult to solve as a basis for security, the length of a key for ensuring 80-bit security is only 80 bits. Accordingly, when a user attempts to register a public key or receive authentication using a secret key in a service such as a web service, it is more preferable to use the above-described public key authentication scheme using multi-order multivariate simultaneous equations that are difficult to solve as a basis for security and in which the number of characters input by the user is small.

When the public key authentication scheme or the digital signature scheme using multi-order multivariate simultaneous equations that are difficult to solve as a basis for security, as disclosed in, for example, JP 2012-98690A, is used, the size of a public key is decreased. Therefore, it is possible to expect the advantageous effect of reducing trouble in terms of administration or management and an improvement in a long-term security level. For example, in terms of the administration, it is possible to expect the advantageous effects of decreasing the restriction on display of the public key and shortening a length which can be input and transmitted. Also, in terms of the management, since the size of a public key is small, it is possible to expect the advantageous effects of reducing the size of a database and setting a key only through a copy manipulation of a text string. Furthermore, in terms of security, it is possible to expect long-term security because of a scheme dependent on mathematically difficult NP-complete problems.

[1.6. Exemplary Operations of System]

Figure 5:
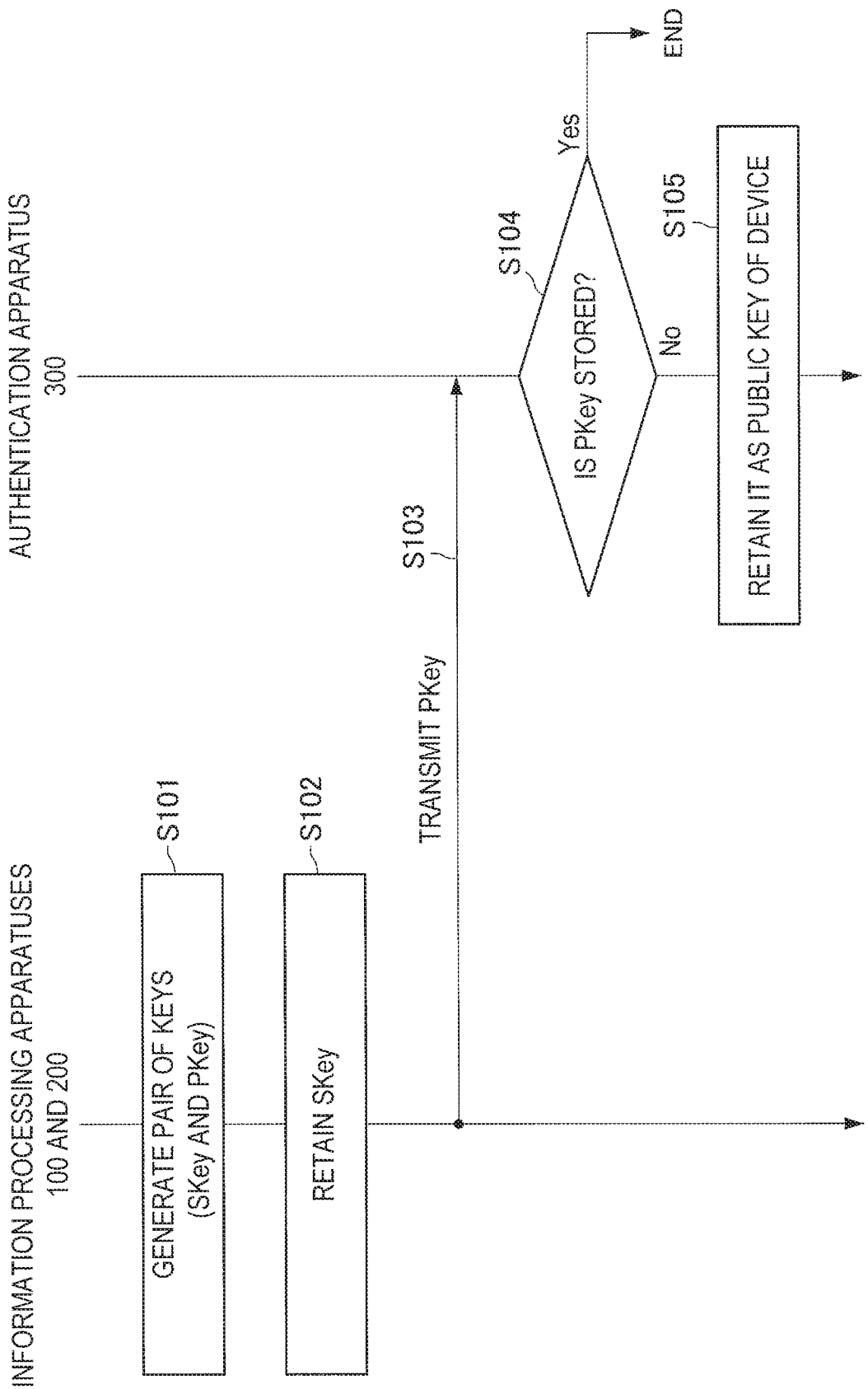
FIG. 5 is a flowchart illustrating exemplary operations of the information processing system 1 according to the first embodiment of the present disclosure.

Next, an exemplary operation of the information processing system 1 according to the first embodiment of the present disclosure will be described. Also, the information processing apparatuses 100 and 200 will hereinafter be described as being possessed by the same user. FIG. 5 is a flowchart illustrating exemplary operations of the information processing system 1 according to the first embodiment of the present disclosure. FIG. 5 illustrates exemplary operations when the information processing apparatuses 100 and 200 register the generated public key in the authentication apparatus 300. The exemplary operations of the information processing system 1 according to the first embodiment of the present disclosure will be described below with reference to FIG. 5.

The information processing apparatuses 100 and 200 register the public key in the authentication apparatus 300 in order to use the service provided by the authentication apparatus 300. In order to register the public key in the authentication apparatus 300, first, the key generation units 115 and 215 of the information processing apparatuses 100 and 200 respectively generate a pair of keys, a secret key and a public key (Step S101). FIG. 5 illustrates a case in which the key generation unit 115 generates the secret key SKey and the public key PKey. The key generation units 115 and 215 generate a pair of keys using the public key authentication scheme using multi-order multivariate simultaneous equations that are difficult to solve as a basis for security as disclosed in, for example, JP 2012-98690A.

When the pair of keys are generated in Step S101, the information processing apparatuses 100 and 200 then retain the secret key out of the pair of generated keys in the storage units 130 and 230 (Step S102). The retaining of the secret key in the storage units 130 and 230 may be controlled by, for example, the control units 120 and 220. In this case, as described above, the control units 120 and 220 preferably cause the secret key to be stored in the area having a tamper-resistant property that is provided in at least one area of each of the storage units 130 and 230.

When the information processing apparatuses 100 and 200 retain the secret key in Step S102, the public key out of the pair of keys generated in Step S101 is then transmitted to the authentication apparatus 300 (Step S103). The transmission of the public key to the authentication apparatus 300 may be performed when the transceiving units 110 and 210 transmit the public key to the authentication apparatus 300, for example, under control of the control units 120 and 220.

When the information processing apparatuses 100 and 200 transmit the public key to the authentication apparatus 300, the authentication apparatus 300 that has received the public key confirms whether the same public key as the received public key has already been stored in the storage unit 330 (Step S104). The confirmation process may be performed by, for example, a control unit 330.

When the same public key as the received public key has already been stored in the storage unit 330 (Yes in Step S104), the authentication apparatus 300 rejects registration of the public key transmitted from the information processing apparatuses 100 and 200. On the other hand, when it confirmed that the same public key as the received public key is not stored in the storage unit 330 (No in Step S104), the authentication apparatus 300 retains the public key transmitted from the information processing apparatuses 100 and 200 in the storage unit 330 as the public key of the apparatus (Step S105). The process of retaining the public key may be performed by, for example, the control unit 330.

When the public key transmitted from the information processing apparatuses 100 and 200 is retained in the storage unit 330 as the public key of the apparatus, the authentication apparatus 300 retains, for example, predetermined information for uniquely identifying the information processing apparatuses 100 and 200 in association with the public key generated by each of the information processing apparatuses 100 and 200 in the storage unit 330.

When the information processing apparatuses 100 and 200 and the authentication apparatus 300 perform a series of operations illustrated in FIG. 5, the information processing apparatuses 100 and 200 can register the public key in the authentication apparatus 300 in order to use the service provided by the authentication apparatus 300. Therefore, if the information processing apparatuses 100 and 200 register the public key in the authentication apparatus 300, when the service provided by the authentication apparatus 300 is used, it is possible to receive authentication using the registered public key according to the public key authentication scheme.

The exemplary operation when the public key generated by the information processing apparatuses 100 and 200 is registered in the authentication apparatus 300 has been described above with reference to FIG. 5. Next, an exemplary operation when an associating process of the public key is performed in the information processing apparatus 200 will be described.

Figure 6:
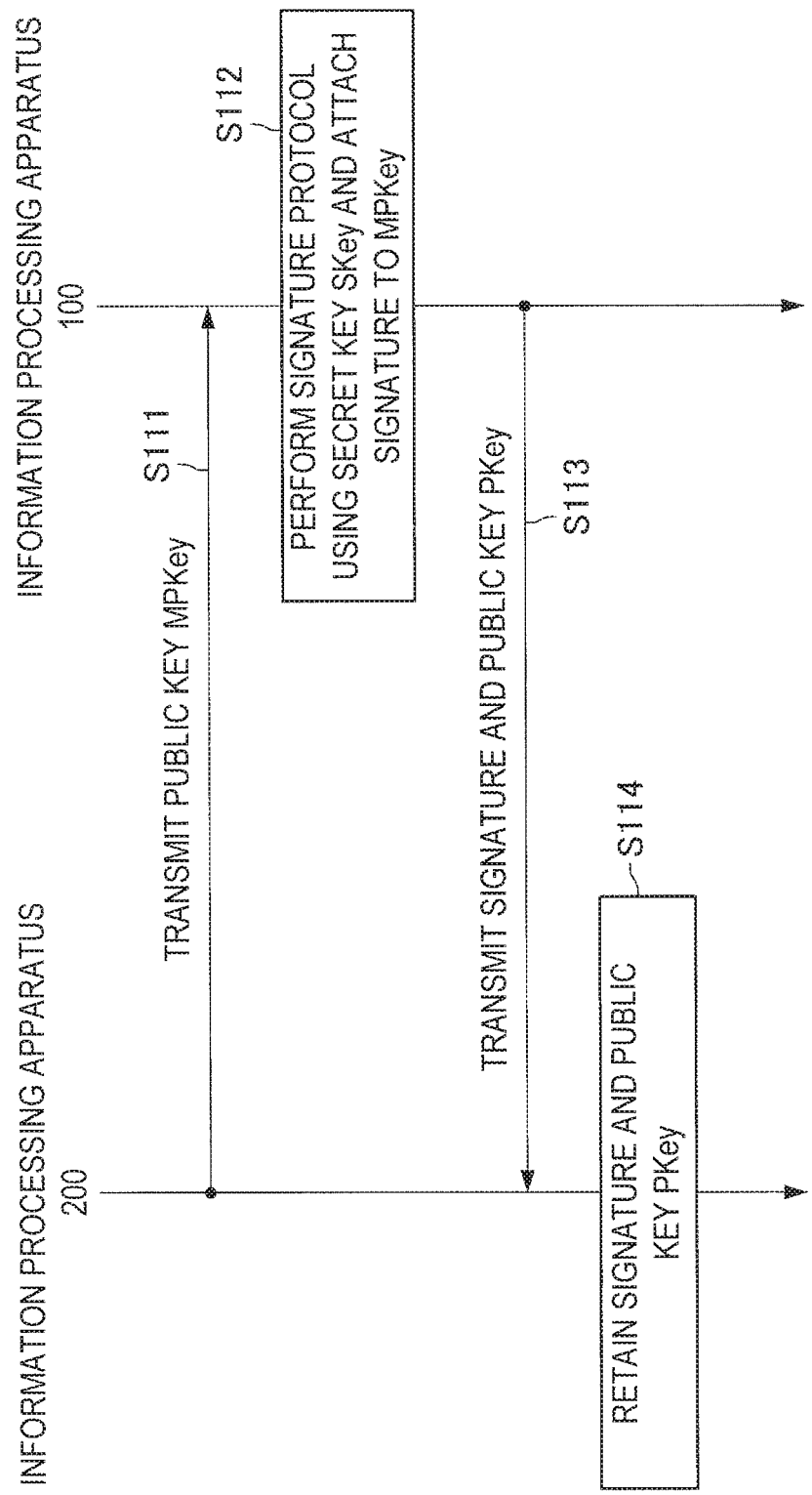
FIG. 6 is a flowchart illustrating exemplary operations of the information processing system 1 according to the first embodiment of the present disclosure.

FIG. 6 is a flowchart illustrating exemplary operations of the information processing system 1 according to the first embodiment of the present disclosure. FIG. 6 illustrates exemplary operations when the associating process of the public key in the information processing apparatus 200 is performed. The exemplary operations of the information processing system 1 according to the first embodiment of the present disclosure will be described below with reference to FIG. 6.

When the public key MPKey generated in the information processing apparatus 200 is associated with the public key PKey generated in the information processing apparatus 100, first, the information processing apparatus 200 transmits the public key MPKey to the information processing apparatus 100 (Step S111). The transmission of the public key MPKey to the information processing apparatus 100 may be performed when the transceiving unit 210 transmits the public key MPKey to the information processing apparatus 100, for example, under control of the control unit 220. The information processing apparatus 200 transmits the public key MPKey to the information processing apparatus 100 in order to receive a reply with a signature attached to the public key MPKey in the information processing apparatus 100.

When the public key MPKey of the information processing apparatus 200 is received from the information processing apparatus 200, the information processing apparatus 100 performs a predetermined signature protocol using the secret key SKey generated by the information processing apparatus 100 and attaches an electronic signature to the public key MPKey of the information processing apparatus 200 (Step S112). The attaching of the electronic signature may be performed by, for example, the control unit 120. The signature protocol performed in Step S112 may be based on an electronic signature scheme disclosed in, for example, JP 2012-98690A.

Attaching, by the information processing apparatus 100, the electronic signature to the public key MPKey of the information processing apparatus 200 corresponds to delegating, by the information processing apparatus 100, handling of the public key PKey generated by the information processing apparatus 100 to the information processing apparatus 200. When the information processing apparatus 100 attaches the electronic signature to the public key MPKey of the information processing apparatus 200 and replies with that and the public key PKey, the information processing apparatus 200 can request suspension of use of the public key PKey generated by the information processing apparatus 100 from the authentication apparatus 300.

When the information processing apparatus 100 attaches the electronic signature to the public key MPKey of the information processing apparatus 200, the information processing apparatus 100 then replies with the electronic signature generated in Step S112 and the public key PKey of the information processing apparatus 100 to the information processing apparatus 200 (Step S113). The transmission of the electronic signature and the public key PKey may be performed when the transceiving unit 110 transmits the electronic signature and the public key PKey to the information processing apparatus 200, for example, under control of the control unit 120.

When the electronic signature and the public key PKey transmitted from the information processing apparatus 100 are received, the information processing apparatus 200 retains the received electronic signature and public key PKey of the information processing apparatus 100 in the storage unit 230 (Step S114). This process may be performed by, for example, the control unit 220.

When the information processing apparatuses 100 and 200 perform such a series of operations, it is possible to associate the public key PKey generated by the information processing apparatus 100 with the public key generated by the information processing apparatus 200 MPKey. When the public key PKey is associated with the public key MPKey, the information processing apparatus 200 can request suspension of use of the public key PKey generated by the information processing apparatus 100 from the authentication apparatus 300.

The exemplary operation when the public key generated by the information processing apparatuses 100 and 200 is registered in the authentication apparatus 300 has been described above with reference to FIG. 6. Next, an exemplary authentication process performed between the information processing apparatus 100 and the authentication apparatus 300 according to the public key authentication scheme will be described.

Figure 7:
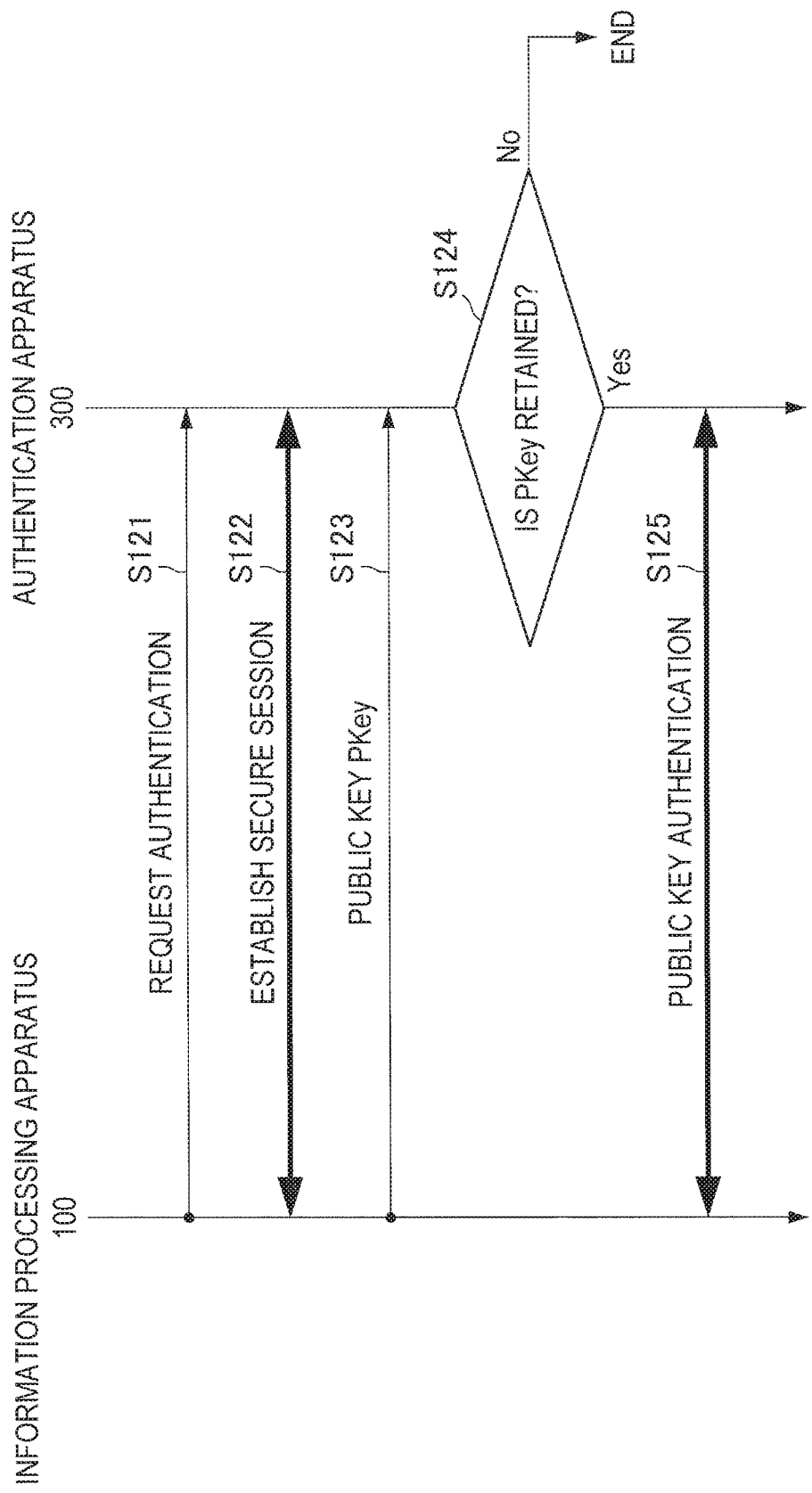
FIG. 7 is a flowchart illustrating exemplary operations of the information processing system 1 according to the first embodiment of the present disclosure.

FIG. 7 is a flowchart illustrating exemplary operations of the information processing system 1 according to the first embodiment of the present disclosure. FIG. 7 illustrates exemplary operations when the authentication process is performed between the information processing apparatus 100 and the authentication apparatus 300 according to the public key authentication scheme. An exemplary operation of the information processing system 1 according to the first embodiment of the present disclosure will be described below with reference to FIG. 7.

When the authentication process is performed between the information processing apparatus 100 and the authentication apparatus 300 according to the public key authentication scheme, first, the information processing apparatus 100 transmits an authentication request to the authentication apparatus 300 (Step S121). The process may be performed when the transceiving unit 110 transmits a predetermined authentication request to the authentication apparatus 300, for example, under control of the control unit 120.

When the information processing apparatus 100 transmits an authentication request to the authentication apparatus 300 and the authentication apparatus 300 receives the authentication request, the information processing apparatus 100 establishes a secure session with the authentication apparatus 300 (Step S122). A process of establishing the secure session may be performed by, for example, the control units 120 and 320. In order to establish the secure session between the information processing apparatus 100 and the authentication apparatus 300, for example, Secure Sockets Layer (SSL)/Transport Layer Security (TLS) can be used, but the present invention is not limited to a specific method.

When the secure session is established between the information processing apparatus 100 and the authentication apparatus 300, the information processing apparatus 100 transmits the public key PKey generated by the information processing apparatus 100 to the authentication apparatus 300 through the established secure session (Step S123). The process may be performed when the transceiving unit 110 transmits the public key PKey to the authentication apparatus 300, for example, under control of the control unit 120.

When the public key PKey transmitted from the information processing apparatus 100 is received, the authentication apparatus 300 confirms whether the public key PKey is already retained in the storage unit 330 (Step S124). The confirmation may be performed by, for example, the control unit 320 searching the storage unit 330.

When it is confirmed based on the determination result in Step S124 that the public key PKey transmitted from the information processing apparatus 100 is already retained in the storage unit 330 (Yes in Step S124), the authentication apparatus 300 performs the authentication process with the information processing apparatus 100 according to the public key authentication scheme public key (Step S125). The information processing apparatus 100 and the authentication apparatus 300 perform a public key authenticating process using the public key authentication scheme using multi-order multivariate simultaneous equations that are difficult to solve as a basis for security as disclosed in, for example, JP 2012-98690A. On the other hand, when it is confirmed based on the determination result in Step S124 that the public key PKey transmitted from the information processing apparatus 100 is not retained in the storage unit 330 (No in Step S124), the authentication apparatus 300 ends the process without performing the public key authenticating process of the public key PKey.

The exemplary authentication process performed between the information processing apparatus 100 and the authentication apparatus 300 according to the public key authentication scheme has been described above with reference to FIG. 7. Next, an exemplary use suspending process of the public key PKey generated by the information processing apparatus 100, which is performed between the information processing apparatus 200 and the authentication apparatus 300, will be described.

Figure 8:
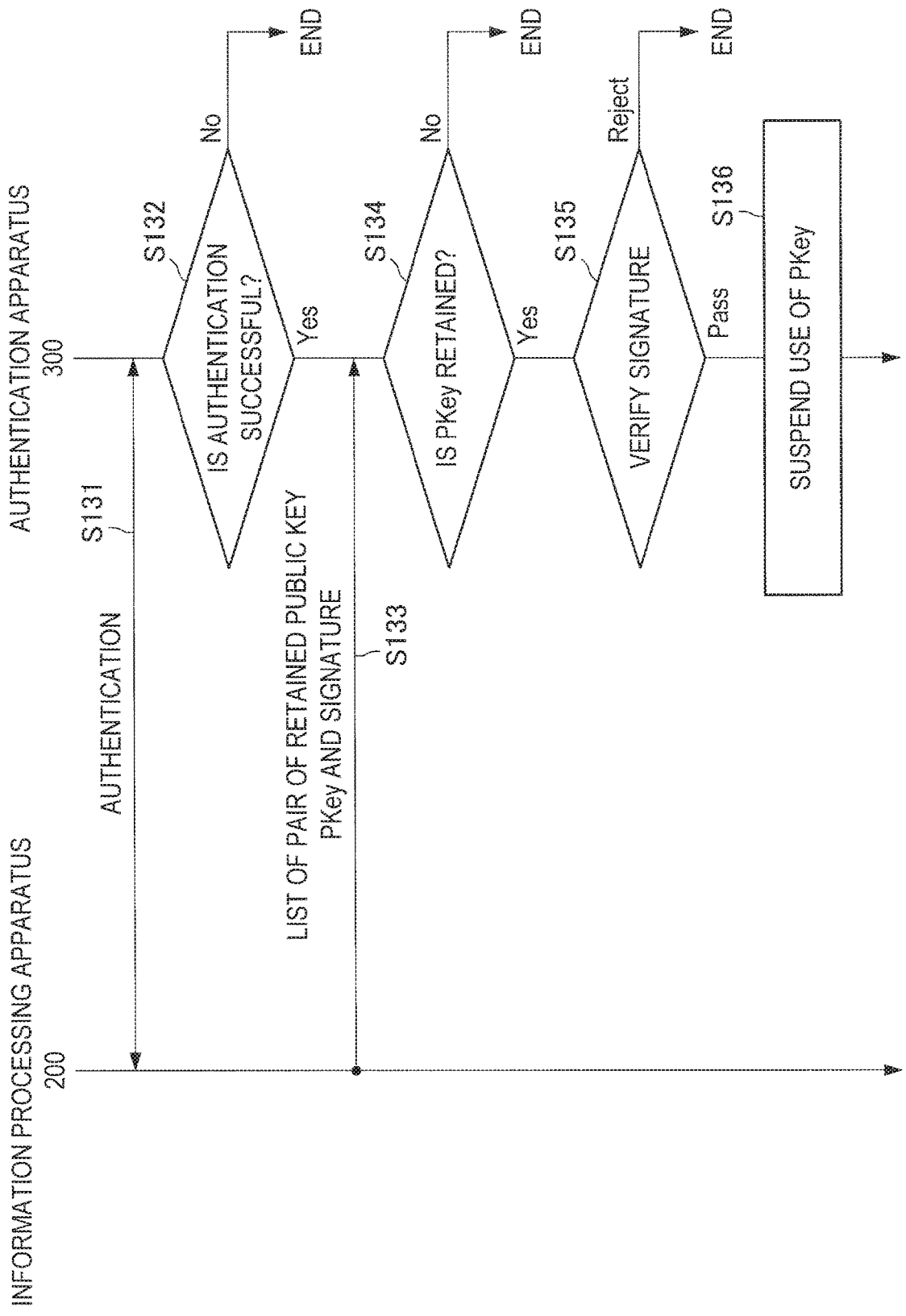
FIG. 8 is a flowchart illustrating exemplary operations of the information processing system 1 according to the first embodiment of the present disclosure.

FIG. 8 is a flowchart illustrating exemplary operations of the information processing system 1 according to the first embodiment of the present disclosure. FIG. 8 illustrates exemplary operations when the use suspending process of the public key PKey generated by the information processing apparatus 100 is performed between the information processing apparatus 200 and the authentication apparatus 300. The exemplary operations of the information processing system 1 according to the first embodiment of the present disclosure will be described below with reference to FIG. 8.

First, the information processing apparatus 200 performs an authentication process with the authentication apparatus 300 according to the public key authentication scheme (Step S131). When the information processing apparatus 200 performs the authentication process with the authentication apparatus 300 according to the public key authentication scheme, the public key generated by the information processing apparatus 200 MPKey is transmitted to the authentication apparatus 300. In addition, since the authentication process performed between the information processing apparatus 200 and the authentication apparatus 300 according to the public key authentication scheme is performed by a series of processes illustrated in FIG. 7, detailed descriptions thereof are omitted herein.

When the authentication process is performed between the information processing apparatus 200 and the authentication apparatus 300 according to the public key authentication scheme, the authentication apparatus 300 determines whether authentication of the information processing apparatus 200 is successful (Step S132). When the authentication apparatus 300 fails to authenticate the information processing apparatus 200 (No in Step S132), the authentication apparatus 300 ends the process without performing the public key authenticating process of the public key MPKey. On the other hand, when the authentication apparatus 300 successfully authenticates the information processing apparatus 200 (Yes in Step S132), the information processing apparatus 200 then transmits a list of a pair of the public key PKey generated by the information processing apparatus 100 retained in the storage unit 230 and the electronic signature to the authentication apparatus 300 (Step S133). Here, when there are a plurality of public keys PKeys (that are generated by the authentication device) associated with the public key MPKey, the information processing apparatus 200 transmits all of the public keys PKeys to the authentication apparatus 300.

When the list of the pair of the public key PKey and the electronic signature is received from the information processing apparatus 200, the authentication apparatus 300 confirms whether the received public key PKey is already retained in the storage unit 330 (Step S134). The confirmation may be performed by, for example, the control unit 320.

When it is confirmed based on the determination result in Step S134 that the public key PKey transmitted from the information processing apparatus 200 is not retained in the storage unit 330 (No in Step S134), the authentication apparatus 300 ends the process without performing a use suspension process of the public key PKey. On the other hand, when it is confirmed based on the determination result in Step S134 that the public key PKey transmitted from the information processing apparatus 200 is retained in the storage unit 330, the authentication apparatus 300 performs a verifying process of the electronic signature transmitted in Step S133 (Step S135). When the authentication apparatus 300 verifies the electronic signature transmitted from the information processing apparatus 200, it is possible to confirm whether the electronic signature was actually generated in the information processing apparatus 100.

When it is confirmed based on the determination result in S135 that the electronic signature transmitted from the information processing apparatus 200 is valid (Pass in Step S135), the authentication apparatus 300 performs the use suspension process of the received public key PKey (Step S136). The use suspension process may be performed by, for example, the control unit 320. As the use suspension process of the public key PKey, for example, a process of deleting the public key PKey itself from the storage unit 330, setting a flag indicating the use suspension state of the public key PKey in the storage unit 330, or moving the public key PKey to a predetermined use suspension list may be performed. The predetermined use suspension list may be stored in, for example, the storage unit 330. When the public key PKey is set with the flag or is moved to the predetermined use suspension list, if there is an attempt to use the public key PKey, the authentication apparatus 300 can detect that the attempt has occurred and record that the attempt has occurred.

On the other hand, when it is confirmed based on the determination result in Step S135 that the electronic signature transmitted from the information processing apparatus 200 is not valid (Reject in Step S135), the authentication apparatus 300 ends the process without performing the use suspension process of the public key PKey.

When the information processing apparatus 200 and the authentication apparatus 300 perform such operations, if the user has lost the information processing apparatus 100 and reception of authentication of the authentication apparatus 300 using the information processing apparatus 100 is not possible, it is possible to suspend use of the public key PKey generated in the information processing apparatus 100.

The exemplary use suspending process of the public key PKey generated by the information processing apparatus 100 performed between the information processing apparatus 200 and the authentication apparatus 300 has been described above with reference to FIG. 8.

While it has been described above that the information processing apparatus 100 and the information processing apparatus 200 are possessed by the same user, the present disclosure is not limited thereto. The information processing apparatuses 100 and 200 may be possessed by different users.

That is, while the public key PKey generated by the information processing apparatus 100 is associated with the public key MPKey generated in the information processing apparatus 200 possessed by the same user in the example of FIG. 6, the public key PKey generated by the information processing apparatus 100 possessed by a user (called a user A) may be associated with the public key MPKey of the information processing apparatus 200 possessed by another user (called a user B). Then, when the information processing apparatus 100 is lost and reception of authentication of the authentication apparatus 300 using the information processing apparatus 100 is disabled, the user A requests suspension of use of the public key PKey from the user B. The user B requests suspension of use of the public key PKey from the authentication apparatus 300 using the possessed information processing apparatus 200.

In this manner, when the public key MPKey generated in the information processing apparatus 200 possessed by the other user is associated with the public key PKey generated in the information processing apparatus 100, if there is a request to suspend use of the public key PKey, for example, from the other user from a remote location, it is possible to quickly prevent damage when the information processing apparatus 100 is lost.

In the above example, when there are a plurality of public keys PKeys (that are generated by the authentication device) associated with the public key MPKey, the information processing apparatus 200 transmits all of the public keys PKeys to the authentication apparatus 300. However, the present disclosure is not limited thereto. The user may select the public key PKey whose use is to be suspended. In this case, the information processing apparatus 200 may output a user interface configured for the user to select the public key PKey whose use is to be suspended.

FIG. 9 illustrates an exemplary user interface that is output from the output unit 225 of the information processing apparatus 200 and enables the user to select the public key PKey whose use is to be suspended. The user interface illustrated in FIG. 9 may be displayed on a display device such as a liquid crystal display panel and an organic EL display panel included in the information processing apparatus 200 or may be displayed on a display device separate from the information processing apparatus 200.

FIG. 9 illustrates a column Ulf in which a list of public keys (that are generated by the authentication device) associated with the public key MPKey of the information processing apparatus 200 are displayed and a column U12 in which checkboxes for the user to set suspension of use of each of the public keys are displayed. The information processing apparatus 200 shows a state in which the user performs selection to suspend use of checked PKey1, PKey2, PKey4, and PKey6 among 6 public keys displayed in the column Ulf in FIG. 9. When the user interface illustrated in FIG. 9 is output, it is possible for the user to select the public key (that is generated by the authentication device) whose use is to be suspended.

The information processing apparatus 200 transmits a pair of the public key selected by the user and the electronic signature corresponding to the public key to the authentication apparatus 300. The authentication apparatus 300 performs the use suspension process of the above public key based on information on the transmitted pair.

Also, the user interface configured for the user to select the public key PKey whose use is to be suspended may be output by the authentication apparatus 300 rather than the information processing apparatus 200 serving as the master device. When the user interface configured for the user to select the public key PKey whose use is to be suspended is output by the authentication apparatus 300, the authentication apparatus 300 outputs, for example, the user interface illustrated in FIG. 9 based on information on the pair of the public key transmitted from the information processing apparatus 200 and the electronic signature corresponding to the public key. When the user selects the public key (that is generated by the authentication device) whose use is to be suspended using the user interface illustrated in FIG. 9, the authentication apparatus 300 performs the use suspension process of the public key selected by the user.

When the authentication apparatus 300 performs the process of moving the public key PKey to the predetermined use suspension list as the use suspension process of the public key PKey, if the public key is transmitted from the information processing apparatuses 100 and 200, it is possible to determine whether the same public key as the public key registered in the use suspension list is transmitted.

Figure 10:
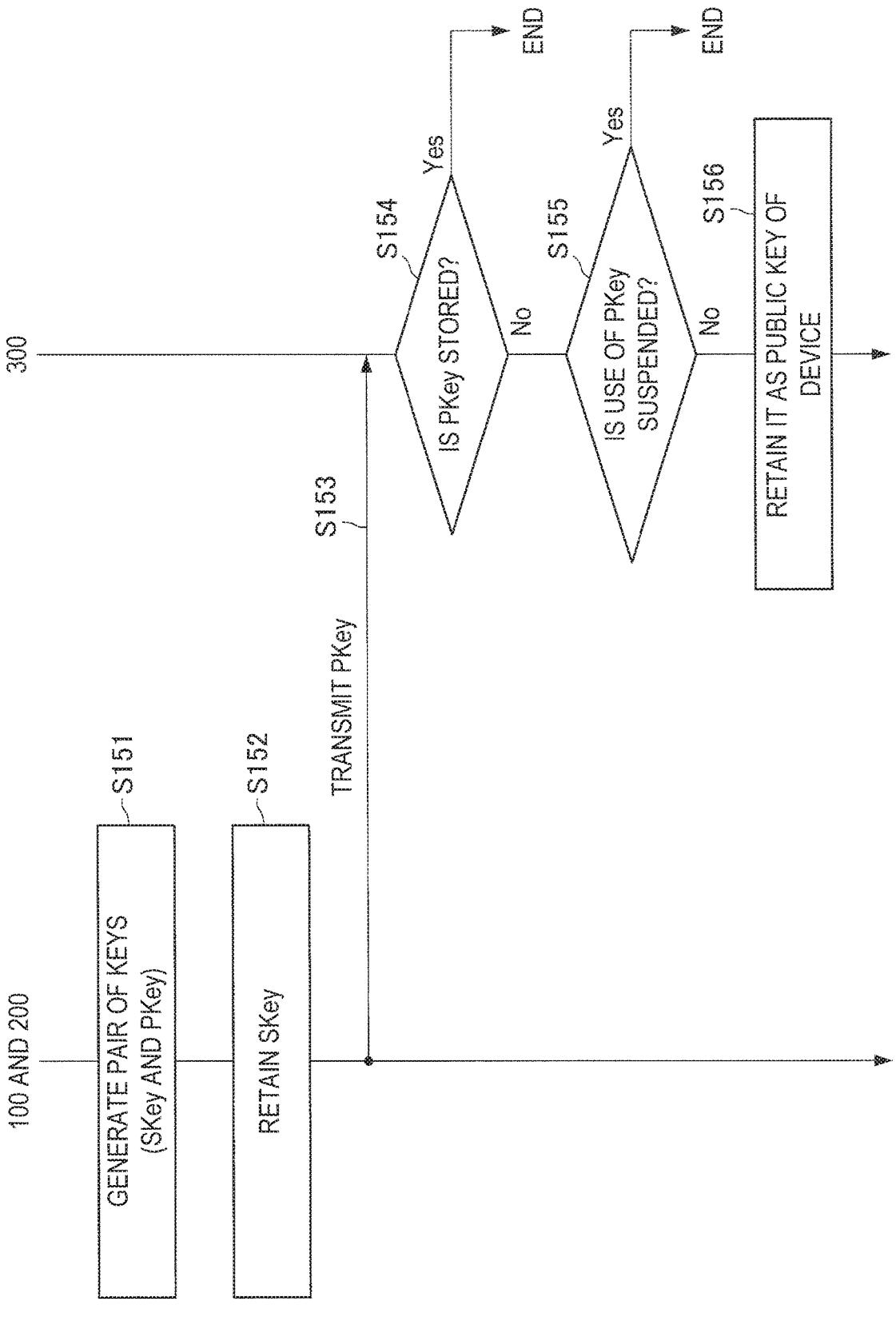
FIG. 10 is a flowchart illustrating exemplary operations of the information processing system 1 according to the first embodiment of the present disclosure.

FIG. 10 is a flowchart illustrating exemplary operations of the information processing system 1 according to the first embodiment of the present disclosure. FIG. 10 illustrates exemplary operations when the information processing apparatuses 100 and 200 register the generated public key in the authentication apparatus 300 and exemplary operations when the authentication apparatus 300 determines whether the same public key as the public key registered in the use suspension list is transmitted from the information processing apparatuses 100 and 200. An exemplary operation of the information processing system 1 according to the first embodiment of the present disclosure will be described below with reference to FIG. 10.

In order to register the public key in the authentication apparatus 300, first, the information processing apparatuses 100 and 200 generate a pair of keys, a secret key and a public key, in the key generation units 115 and 215 (Step S151). When the pair of keys are generated in Step S151, the information processing apparatuses 100 and 200 then retain the secret key out of the pair of generated keys in the storage units 130 and 230 (Step S152).

When the information processing apparatuses 100 and 200 retain the secret key in Step S152, the public key out of the pair of keys generated in Step S151 is then transmitted to the authentication apparatus 300 (Step S153). The transmission of the public key to the authentication apparatus 300 may be performed when the transceiving units 110 and 210 transmit the public key to the authentication apparatus 300, for example, under control of the control units 120 and 220.

When the information processing apparatuses 100 and 200 transmit the public key to the authentication apparatus 300, the authentication apparatus 300 that has received the public key confirms whether the same public key as the received public key has already been stored in the storage unit 330 (Step S154). When the same public key as the received public key has already been stored in the storage unit 330, the authentication apparatus 300 rejects registration of the public key transmitted from the information processing apparatuses 100 and 200.

On the other hand, when the same public key as the received public key is not stored in the storage unit 330, the authentication apparatus 300 confirms whether the same public key as the received public key is registered in the use suspension list (Step S155). The confirmation process may be performed by, for example, the control unit 330. When the same public key as the received public key is registered in the use suspension list, the authentication apparatus 300 rejects registration of the public key transmitted from the information processing apparatuses 100 and 200.

On the other hand, when the same public key as the received public key is not registered in the use suspension list, the public key transmitted from the information processing apparatuses 100 and 200 is retained in the storage unit 330 as the public key of the apparatus (Step S156). A retaining process of the public key may be performed by, for example, the control unit 330. When the public key transmitted from the information processing apparatuses 100 and 200 is retained in the storage unit 330 as the public key of the apparatus, the authentication apparatus 300 retains, for example, predetermined information for uniquely identifying the information processing apparatuses 100 and 200 in association with the public key generated by each of the information processing apparatuses 100 and 200 in the storage unit 330.

The exemplary operation when the public key generated by the information processing apparatuses 100 and 200 is registered in the authentication apparatus 300 has been described above with reference to FIG. 10. In this manner, when the authentication apparatus 300 performs the process of moving the public key PKey to the predetermined use suspension list as the use suspension process of the public key PKey, if the public key is transmitted from the information processing apparatuses 100 and 200, it is possible to determine whether the same public key as the public key registered in the use suspension list is transmitted. Next, an exemplary authentication process performed between the information processing apparatus 100 and the authentication apparatus 300 according to the public key authentication scheme will be described.

Figure 11:
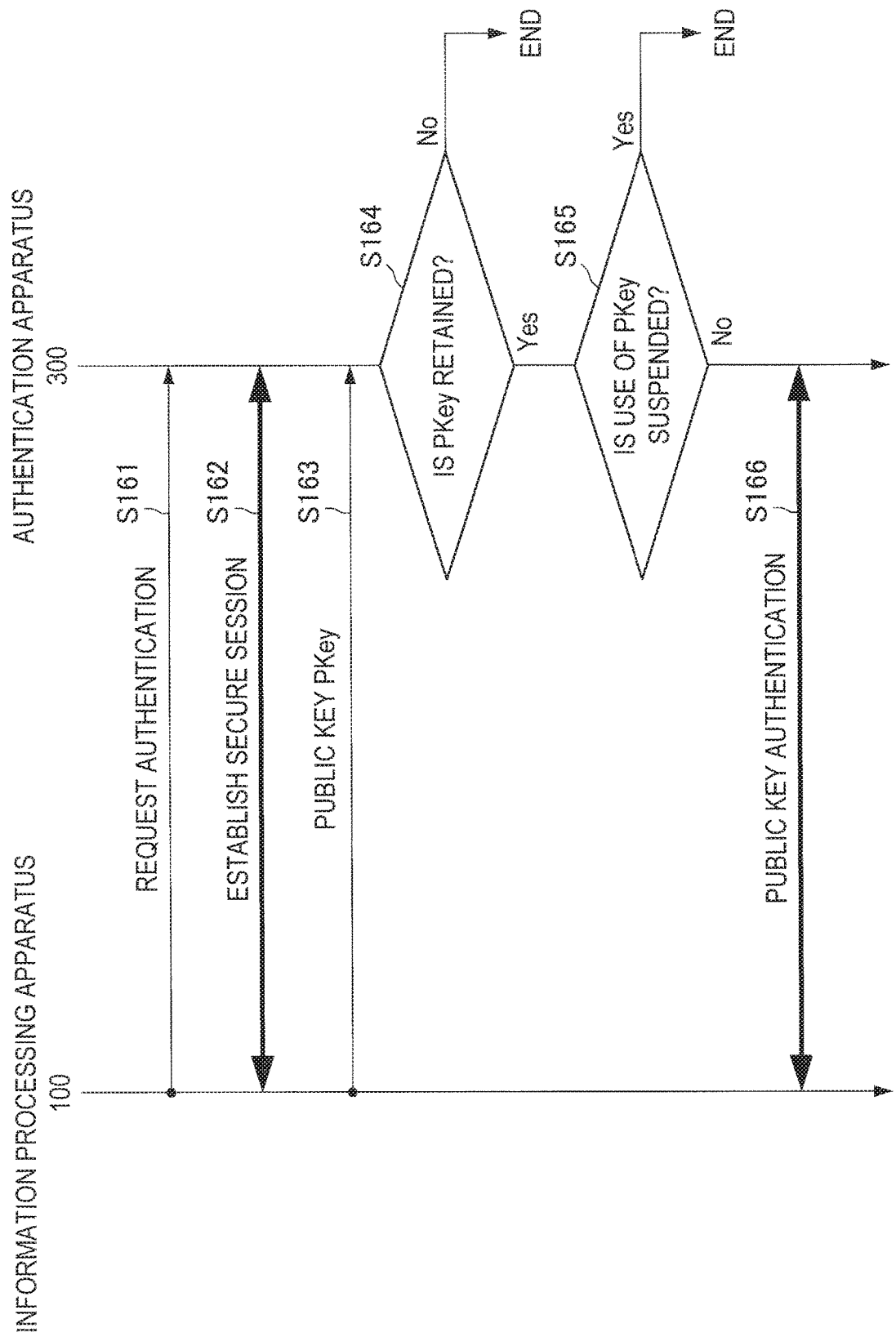
FIG. 11 is a flowchart illustrating exemplary operations of the information processing system 1 according to the first embodiment of the present disclosure.

FIG. 11 is a flowchart illustrating exemplary operations of the information processing system 1 according to the first embodiment of the present disclosure. FIG. 11 illustrates exemplary operations when the authentication process is performed between the information processing apparatus 100 and the authentication apparatus 300 according to the public key authentication scheme. An exemplary operation of the information processing system 1 according to the first embodiment of the present disclosure will be described below with reference to FIG. 11.

When the authentication process is performed between the information processing apparatus 100 and the authentication apparatus 300 according to the public key authentication scheme, first, the information processing apparatus 100 transmits an authentication request to the authentication apparatus 300 (Step S161). When the information processing apparatus 100 transmits an authentication request to the authentication apparatus 300 and the authentication apparatus 300 receives the authentication request, the information processing apparatus 100 establishes a secure session with the authentication apparatus 300 (Step S162).

When the secure session is established between the information processing apparatus 100 and the authentication apparatus 300, the information processing apparatus 100 transmits the public key PKey generated by the information processing apparatus 100 to the authentication apparatus 300 through the established secure session (Step S163). The process may be performed when the transceiving unit 110 transmits the public key PKey to the authentication apparatus 300, for example, under control of the control unit 120.

When the public key PKey transmitted from the information processing apparatus 100 is received, the authentication apparatus 300 confirms whether the public key PKey is already retained in the storage unit 330 (Step S164). The confirmation may be performed by, for example, the control unit 320.

When it is confirmed based on the determination result in Step S164 that the public key PKey transmitted from the information processing apparatus 100 is already retained in the storage unit 330 (Yes in Step S164), the authentication apparatus 300 confirms whether the same public key as the received public key is registered in the use suspension list (Step S165). On the other hand, when it is confirmed based on the determination result in Step S124 that the public key PKey transmitted from the information processing apparatus 100 is not retained in the storage unit 330 (No in Step S124), the authentication apparatus 300 ends the process without performing the public key authenticating process of the public key PKey.

The confirmation process in Step S165 may be performed by, for example, the control unit 330. When the same public key as the received public key is registered in the use suspension list (No in Step S165), the authentication apparatus 300 rejects registration of the public key transmitted from the information processing apparatuses 100 and 200.

On the other hand, when the same public key as the received public key is not registered in the use suspension list (Yes in Step S165), the authentication apparatus 300 performs the public key authenticating process with the information processing apparatus 100 according to the public key authentication scheme (Step S166).

The exemplary authentication process performed between the information processing apparatus 100 and the authentication apparatus 300 according to the public key authentication scheme has been described above with reference to FIG. 11. Next, an exemplary use suspending process of the public key PKey generated by the information processing apparatus 100, which is performed between the information processing apparatus 200 and the authentication apparatus 300, will be described.

Figure 12:
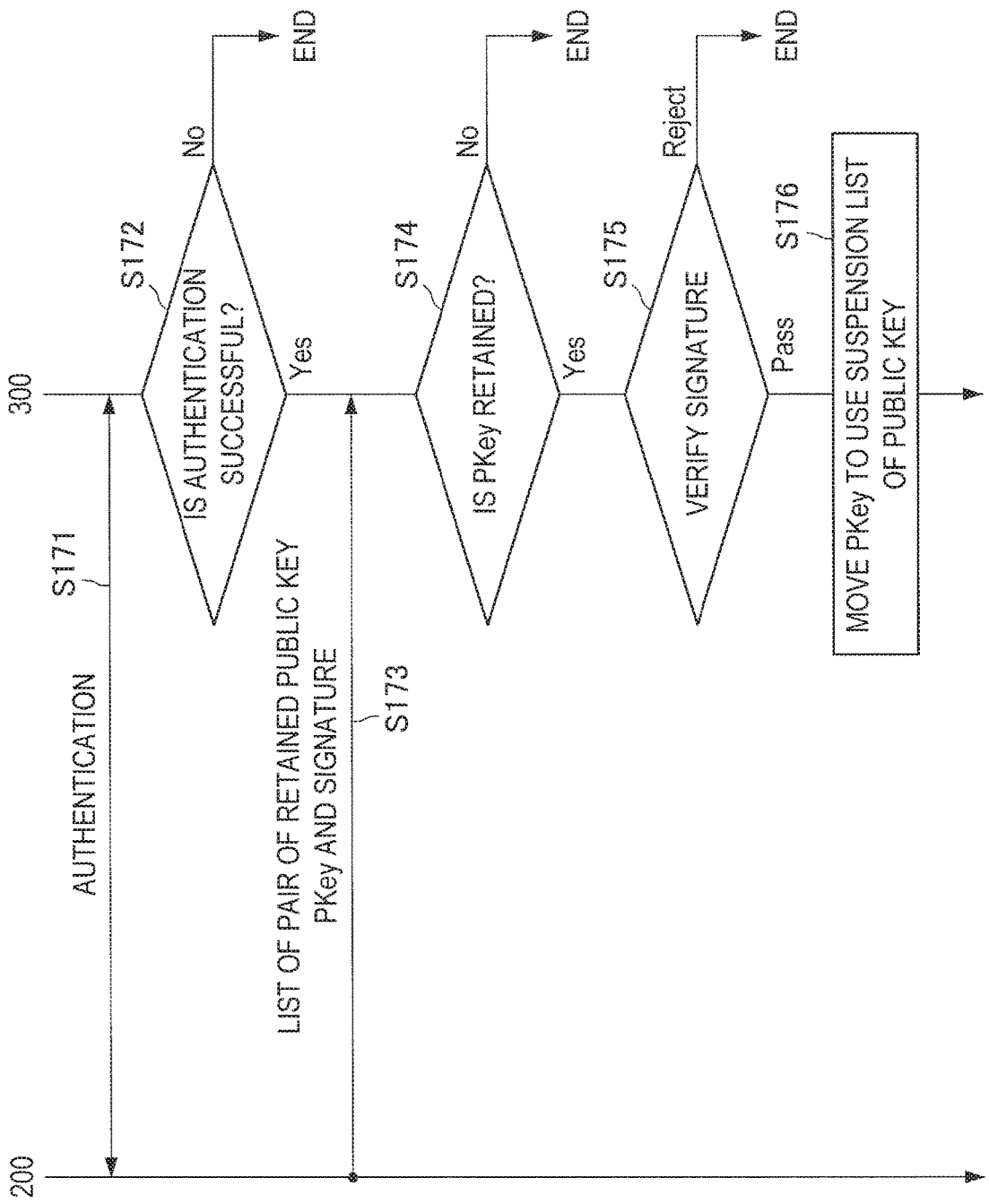
FIG. 12 is a flowchart illustrating exemplary operations of the information processing system 1 according to the first embodiment of the present disclosure.

FIG. 12 is a flowchart illustrating exemplary operations of the information processing system 1 according to the first embodiment of the present disclosure. FIG. 12 illustrates exemplary operations when the use suspending process of the public key PKey generated by the information processing apparatus 100 is performed between the information processing apparatus 200 and the authentication apparatus 300. The exemplary operations of the information processing system 1 according to the first embodiment of the present disclosure will be described below with reference to FIG. 12.

First, the information processing apparatus 200 performs the authentication process with the authentication apparatus 300 according to the public key authentication scheme (Step S171). When the authentication process is performed between the information processing apparatus 200 and the authentication apparatus 300 according to the public key authentication scheme, the authentication apparatus 300 determines whether authentication of the information processing apparatus 200 is successful (Step S172). When the authentication apparatus 300 fails to authenticate the information processing apparatus 200 (No in Step S172), the authentication apparatus 300 ends the process without performing the public key authenticating process of the public key MPKey. On the other hand, when the authentication apparatus 300 successfully authenticates the information processing apparatus 200 (Yes in Step S172), the information processing apparatus 200 then transmits a list of a pair of the public key PKey generated by the information processing apparatus 100 retained in the storage unit 230 and the electronic signature to the authentication apparatus 300 (Step S173). Here, when there are a plurality of public keys PKeys (that are generated by the authentication device) associated with the public key MPKey, the information processing apparatus 200 transmits all of the public keys PKeys to the authentication apparatus 300.

When the list of the pair of the public key PKey and the electronic signature is received from the information processing apparatus 200, the authentication apparatus 300 confirms whether the received public key PKey is already retained in the storage unit 330 (Step S174). When it is confirmed based on the determination result in Step S174 that the public key PKey transmitted from the information processing apparatus 200 is not retained in the storage unit 330 (No in Step S134), the authentication apparatus 300 ends the process without performing the use suspension process of the public key PKey. On the other hand, when it is confirmed based on the determination result in Step S174 that the public key PKey transmitted from the information processing apparatus 200 is retained in the storage unit 330, the authentication apparatus 300 performs the verifying process of the received electronic signature (Step S175).

When it is confirmed based on the determination result in Step S175 that the electronic signature transmitted from the information processing apparatus 200 is valid (Pass in Step S175), the authentication apparatus 300 performs the process of moving the public key PKey to the predetermined use suspension list of the received public key PKey (Step S176). The process of moving the public key PKey to the predetermined use suspension list may be performed by, for example, the control unit 320. On the other hand, when it is confirmed based on the determination result in Step S175 that the electronic signature transmitted from the information processing apparatus 200 is not valid (Reject in Step S175), the authentication apparatus 300 ends the process without performing the use suspension process of the public key PKey.

The exemplary operation of the information processing system 1 according to the first embodiment of the present disclosure has been described above with reference to FIG. 12. In this manner, the authentication apparatus 300 can perform the process of moving the public key PKey to the predetermined use suspension list as the use suspension process of the public key PKey.

The above example shows a case in which the process of associating the public key PKey generated in the information processing apparatus 100 with the public key MPKey generated in the information processing apparatus 200 is performed between the information processing apparatus 100 and the information processing apparatus 200. The associating process may be performed in advance, for example, at the time of factory shipping. When the user purchases and obtains the pair of the information processing apparatuses 100 and 200 on which association of the public key has already been performed, it is possible to perform suspension of use of the public key PKey more easily.

The exemplary operation of the information processing system 1 according to the first embodiment of the present disclosure has been described above. When the information processing system 1 according to the first embodiment of the present disclosure performs the operations described above, it is possible to associate the public key PKey generated by the information processing apparatus 100 serving as the authentication device with the public key MPKey generated by the information processing apparatus 200 serving as the master device in the information processing apparatus 200. Then, in the information processing system 1 according to the first embodiment of the present disclosure, the information processing apparatus 200 serving as the master device can request suspension of use of the public key PKey generated by the information processing apparatus 100 serving as the authentication device from the authentication apparatus 300.

<2. Second Embodiment>

In the information processing system 1 according to the first embodiment of the present disclosure described above, the public key PKey generated by the information processing apparatus 100 serving as the authentication device and the public key MPKey generated by the information processing apparatus 200 serving as the master device are associated in the information processing apparatus 200. In the above second embodiment of the present disclosure to be described below, a case in which the public key PKey generated by the information processing apparatus 100 serving as the authentication device and the public key MPKey generated by the information processing apparatus 200 serving as the master device are associated in the authentication apparatus 300 will be described.

[2.1. Exemplary Operations of System]

Since the configuration of the apparatus and the exemplary functional configuration of each apparatus are the same as those in the information processing system 1 according to the first embodiment of the present disclosure, the configuration will not be described. Exemplary operations of the information processing system 1 according to the second embodiment of the present disclosure will be described below in detail.

Figure 13:
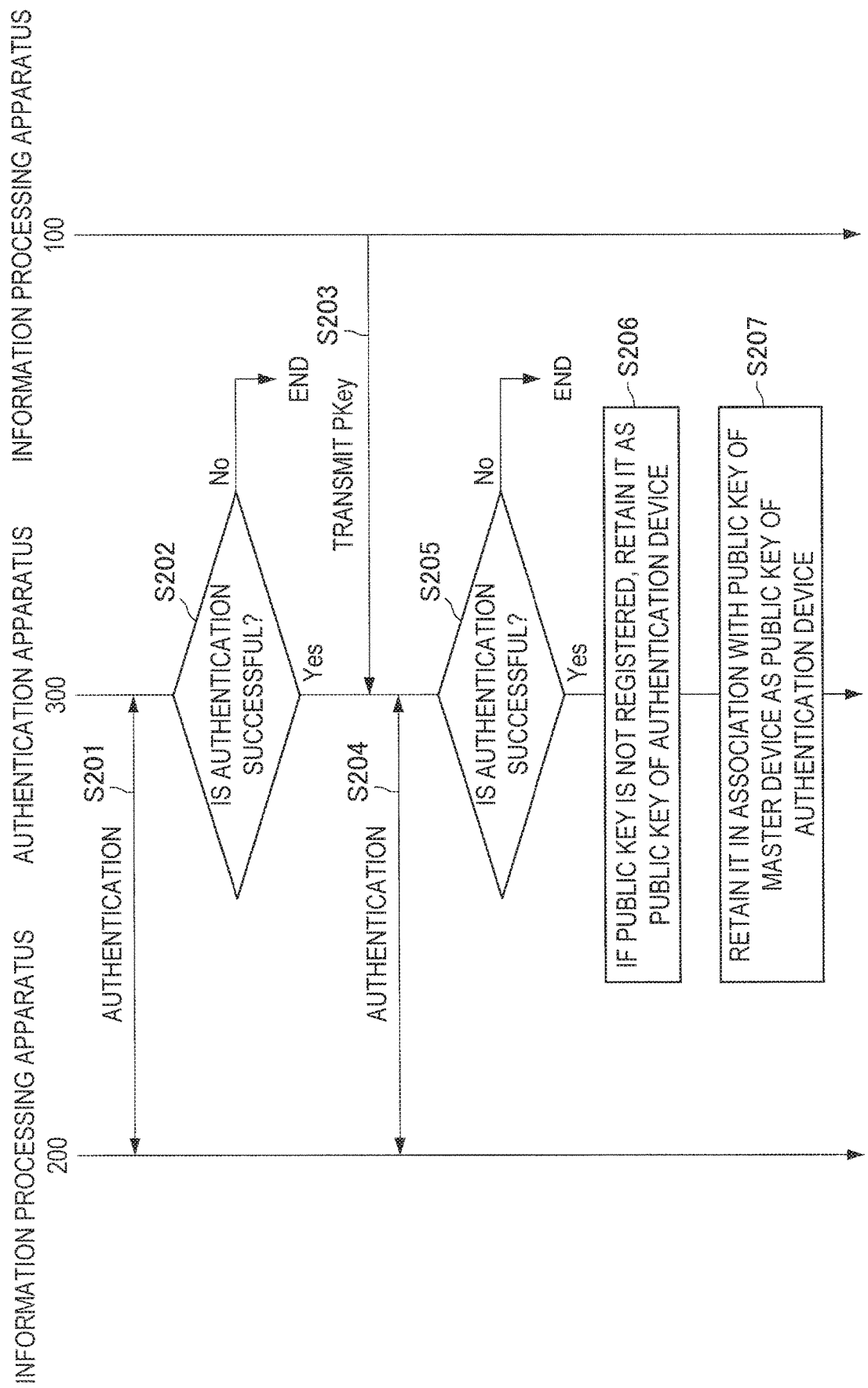
FIG. 13 is a flowchart illustrating exemplary operations of the information processing system 1 according to the second embodiment of the present disclosure.

FIG. 13 is a flowchart illustrating exemplary operations of the information processing system 1 according to the second embodiment of the present disclosure. FIG. 13 illustrates exemplary operations when the associating process of the public key in the authentication apparatus 300 is performed. The exemplary operations of the information processing system 1 according to the second embodiment of the present disclosure will be described below with reference to FIG. 13.

First, the information processing apparatus 200 performs the authentication process with the authentication apparatus 300 according to the public key authentication scheme (Step S201). When the authentication process is performed between the information processing apparatus 200 and the authentication apparatus 300 according to the public key authentication scheme, the authentication apparatus 300 determines whether authentication of the information processing apparatus 200 is successful (Step S202).

When the authentication apparatus 300 fails to authenticate the information processing apparatus 200 (No in Step S202), the authentication apparatus 300 ends the process without performing the public key authenticating process of the public key MPKey. On the other hand, when the authentication apparatus 300 successfully authenticates the information processing apparatus 200 (Yes in Step S202), the information processing apparatus 100 then transmits the public key PKey out of the pair of previously generated keys to the authentication apparatus 300 (Step S203).

Also, while the public key PKey is transmitted from the information processing apparatus 100 to the authentication apparatus 300 in the example illustrated in FIG. 13, the present disclosure is not limited thereto. In the public key authentication scheme using multi-order multivariate simultaneous equations that are difficult to solve as a basis for security disclosed in, for example, JP 2012-98690A, the key has a length of about 80 bytes. Therefore, when the public key authentication scheme is used, the public key PKey is not transmitted to the authentication apparatus 300, but the user may register the public key PKey in the authentication apparatus 300 by manually inputting the public key PKey.

When the public key PKey is received from the information processing apparatus 100 in Step S203, the authentication apparatus 300 then performs the authentication process with the authentication apparatus 300 according to the public key authentication scheme again (Step S204). When the authentication process is performed between the information processing apparatus 200 and the authentication apparatus 300 according to the public key authentication scheme, the authentication apparatus 300 determines whether authentication of the information processing apparatus 200 is successful (Step S205).

When the authentication apparatus 300 performs authentication with the information processing apparatus 200 serving as the master device before and after the public key PKey of the information processing apparatus 100 is received, it is possible to safely associate the public key MPKey retained by the information processing apparatus 200 with the public key PKey of the information processing apparatus 100.

When the authentication apparatus 300 fails to authenticate the information processing apparatus 200 (No in Step S205), the authentication apparatus 300 ends the process without performing the public key authenticating process of the public key MPKey. On the other hand, when the authentication apparatus 300 successfully authenticates the information processing apparatus 200 (Yes in Step S205), if the public key PKey transmitted from the information processing apparatus 100 in Step S203 is not registered, the information processing apparatus 100 then registers the public key PKey as the public key of the information processing apparatus 100 serving as the authentication device (Step S206).

When the public key PKey is registered as the public key of the information processing apparatus 100 serving as the authentication device in Step S206, the authentication apparatus 300 then retains the public key MPKey of the information processing apparatus 200 serving as the master device and the public key PKey of the information processing apparatus 100 serving as the authentication device in a form in which they are associated as a pair (Step S207).

When the information processing system 1 according to the second embodiment of the present disclosure performs the series of operations illustrated in FIG. 13, it is possible to retain the public key MPKey of the information processing apparatus 200 serving as the master device and the public key PKey of the information processing apparatus 100 serving as the authentication device in the authentication apparatus 300 in a form in which they are associated as a pair.

The exemplary operations of the information processing system 1 according to the second embodiment of the present disclosure have been described above with reference to FIG. 13. In such an association, the information processing apparatuses 100 and 200 may be possessed by different users, similarly to the first embodiment. In addition, when there are a plurality of public keys PKeys (that are generated by the authentication device) associated with the public key MPKey, the user may select the public key PKey whose use is to be suspended, similarly to the first embodiment. An association between the public key PKey and the MPKey may also be performed in advance, for example, at the time of factory shipping, similarly to the first embodiment.

Next, an exemplary use suspending process of the public key PKey generated by the information processing apparatus 100, which is performed between the information processing apparatus 200 and the authentication apparatus 300, will be described.

Figure 14:
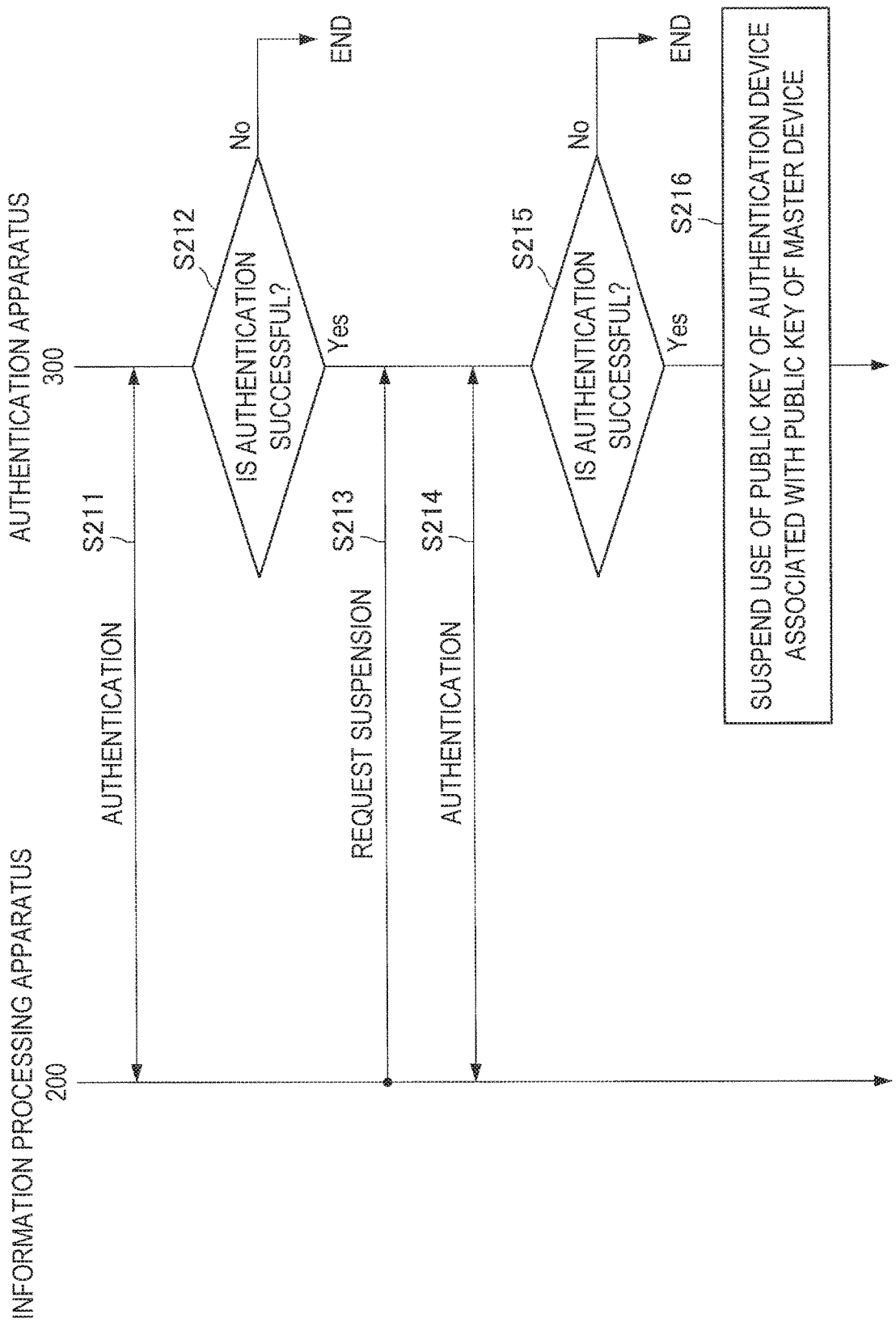
FIG. 14 is a flowchart illustrating exemplary operations of the information processing system 1 according to the second embodiment of the present disclosure.

FIG. 14 is a flowchart illustrating exemplary operations of the information processing system 1 according to the second embodiment of the present disclosure. FIG. 14 illustrates exemplary operations when the use suspending process of the public key PKey generated by the information processing apparatus 100 is performed between the information processing apparatus 200 and the authentication apparatus 300. The exemplary operations of the information processing system 1 according to the second embodiment of the present disclosure will be described below with reference to FIG. 14.

When there is a request to suspend use of the public key PKey generated by the information processing apparatus 100 from the information processing apparatus 200, first, the information processing apparatus 200 performs the authentication process with the authentication apparatus 300 according to the public key authentication scheme (Step S211). When the authentication process is performed between the information processing apparatus 200 and the authentication apparatus 300 according to the public key authentication scheme, the authentication apparatus 300 determines whether authentication of the information processing apparatus 200 is successful (Step S212).

When the authentication apparatus 300 fails to authenticate the information processing apparatus 200 (No in Step S212), the authentication apparatus 300 ends the process without performing the public key authenticating process of the public key MPKey. On the other hand, when the authentication apparatus 300 successfully authenticates the information processing apparatus 200 (Yes in Step S212), the information processing apparatus 200 transmits a suspension request of the public key PKey of the information processing apparatus 100 associated with the public key MPKey of the information processing apparatus 200 to the authentication apparatus 300 (Step S213).

When the suspension request of the public key PKey of the information processing apparatus 100 transmitted from the information processing apparatus 200 is received, the authentication apparatus 300 then performs the authentication process with the information processing apparatus 200 according to the public key authentication scheme (Step S214). When the authentication process is performed between the information processing apparatus 200 and the authentication apparatus 300 according to the public key authentication scheme, the authentication apparatus 300 determines whether authentication of the information processing apparatus 200 is successful (Step S215).

When the authentication apparatus 300 fails to authenticate the information processing apparatus 200 (No in Step S215), the authentication apparatus 300 ends the process without performing the public key authenticating process of the public key MPKey. On the other hand, when the authentication apparatus 300 successfully authenticates the information processing apparatus 200 (Yes in Step S215), the use suspension process of the public key PKey of the information processing apparatus 100 associated with the public key MPKey of the information processing apparatus 200 is performed (Step S216).

As the use suspension process of the public key PKey, for example, a process of deleting the public key PKey from the storage unit 330, setting a flag indicating the use suspension state of the public key PKey in the storage unit 330, or moving the public key PKey to the predetermined use suspension list may be performed. The predetermined use suspension list may be stored in, for example, the storage unit 330.

When the information processing apparatus 200 and the authentication apparatus 300 perform such operations, if the user has lost the information processing apparatus 100 and reception of authentication of the authentication apparatus 300 using the information processing apparatus 100 is not possible, it is possible to suspend use of the public key PKey generated in the information processing apparatus 100.

The exemplary use suspending process of the public key PKey generated by the information processing apparatus 100 performed between the information processing apparatus 200 and the authentication apparatus 300 has been described above with reference to FIG. 14.

<3. Third Embodiment>

After use of the public key PKey generated by the information processing apparatus 100 is suspended, resumption of suspended use of the public key PKey may be considered, for example, when the information processing apparatus 100 is found. An exemplary process of resuming use of the public key PKey whose use was suspended once will be described below.

[3.1. When Association is Performed in Master Device]

Figure 15:
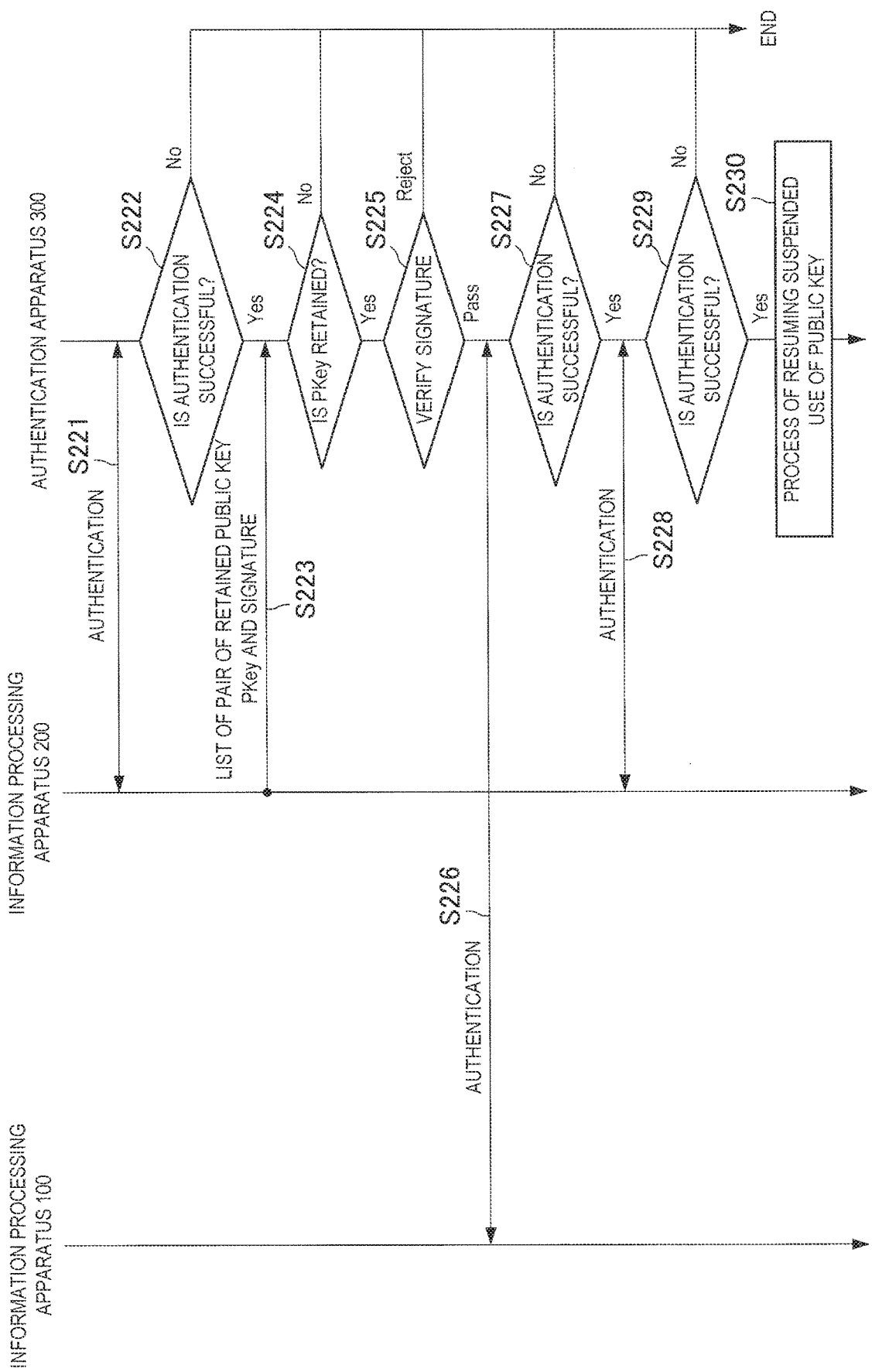
FIG. 15 is a flowchart illustrating exemplary operations of the information processing system 1 according to the second embodiment of the present disclosure.

FIG. 15 is a flowchart illustrating exemplary operations of the information processing system 1 according to the second embodiment of the present disclosure. FIG. 15 illustrates exemplary operations when the process of resuming use of the public key PKey generated by the information processing apparatus 100 is performed between the information processing apparatuses 100 and 200 and the authentication apparatus 300. In addition, the following example is an exemplary operation when association between the public key PKey and the MPKey is performed in the information processing apparatus 200. The exemplary operations of the information processing system 1 according to the second embodiment of the present disclosure will be described below with reference to FIG. 15.

Note that, in order to resume use of the public key PKey whose use was suspended once, it is preferable to perform the process of setting a flag indicating the use suspension state of the public key PKey in the storage unit 330 or the process of moving the public key PKey to the predetermined use suspension list, rather than performing the process of deleting the public key PKey from the storage unit 330, When the information processing apparatus 200 requests the process of resuming use of the public key PKey whose use was suspended once, first, the information processing apparatus 200 performs the authentication process with the authentication apparatus 300 according to the public key authentication scheme (Step S221). When the authentication process is performed between the information processing apparatus 200 and the authentication apparatus 300 according to the public key authentication scheme, the authentication apparatus 300 determines whether authentication of the information processing apparatus 200 is successful (Step S222).

When the authentication apparatus 300 fails to authenticate the information processing apparatus 200 (No in Step S222), the authentication apparatus 300 ends the process without performing the process of resuming use of the public key PKey. On the other hand, when the authentication apparatus 300 successfully authenticates the information processing apparatus 200 (Yes in Step S222), the information processing apparatus 200 transmits a list of a pair of the public key PKey generated by the information processing apparatus 100 and the electronic signature retained in the storage unit 230 to the authentication apparatus 300 (Step S223).

When the list of the pair of the public key PKey and the electronic signature is received from the information processing apparatus 200, the authentication apparatus 300 confirms whether the received public key PKey is already retained in the storage unit 330 (Step S224). When it is confirmed based on the determination result in Step S224 that the public key PKey transmitted from the information processing apparatus 200 is not retained in the storage unit 330 (No in Step S224), the authentication apparatus 300 ends the process without performing the process of resuming use of the public key PKey.

On the other hand, when it is confirmed based on the determination result in Step S224 that the public key PKey transmitted from the information processing apparatus 200 is retained in the storage unit 330, the authentication apparatus 300 performs a verifying process of the electronic signature transmitted in Step S223 (Step S225). When the authentication apparatus 300 verifies the electronic signature transmitted from the information processing apparatus 200, it is possible to confirm whether the electronic signature was actually generated in the information processing apparatus 100.

When it is confirmed based on the determination result in Step S225 that the electronic signature transmitted from the information processing apparatus 200 is not valid (Reject in Step S225), the authentication apparatus 300 ends the process without performing the process of resuming use of the public key PKey. On the other hand, when it is confirmed based on the determination result in Step S5 that the electronic signature transmitted from the information processing apparatus 200 is valid (Pass in Step S225), the authentication apparatus 300 then performs the authentication process with the information processing apparatus 100 that has generated the public key PKey whose use is to be resumed according to the public key authentication scheme (Step S226). The authentication apparatus 300 can confirm whether the secret key SKey corresponding to the public key PKey whose use is to be resumed is in the information processing apparatus 100 according to the authentication process in Step S226.

When the authentication process is performed between the information processing apparatus 100 and the authentication apparatus 300 according to the public key authentication scheme, the authentication apparatus 300 determines whether authentication of the information processing apparatus 100 is successful (Step S227). When the authentication apparatus 300 fails to authenticate the information processing apparatus 100 (No in Step S227), the authentication apparatus 300 ends the process without performing the process of resuming use of the public key PKey. On the other hand, when the authentication apparatus 300 successfully authenticates the information processing apparatus 100 (Yes in Step S227), the authentication apparatus 300 then performs the authentication process with the information processing apparatus 200 according to the public key authentication scheme again (Step S228). When the authentication process is performed between the information processing apparatus 200 and the authentication apparatus 300 according to the public key authentication scheme, the authentication apparatus 300 determines whether authentication of the information processing apparatus 200 is successful (Step S229).

When the authentication apparatus 300 fails to authenticate the information processing apparatus 200 (No in Step S229), the authentication apparatus 300 ends the process without performing the process of resuming use of the public key PKey. On the other hand, when the authentication apparatus 300 successfully authenticates the information processing apparatus 200 (Yes in Step S229), the authentication apparatus 300 performs the process of resuming use of the public key PKey that was suspended once (Step S230). As the process of resuming use of the public key PKey that was suspended once, the authentication apparatus 300 performs, for example, the process of deleting the flag indicating the use suspension state of the public key PKey from the storage unit 330, or the process of moving the public key PKey from the predetermined use suspension list.

When the information processing apparatuses 100 and 200 and the authentication apparatus 300 perform such operations, it is possible to resume use of the public key that is generated in the information processing apparatus 100 and whose use was suspended once in the authentication apparatus 300. When use of the public key generated in the information processing apparatus 100 is resumed, the user need not perform a process of regenerating a key when the lost information processing apparatus 100 is found or a process of registering the regenerated public key in the authentication apparatus 300.

Note that, while authentication of the information processing apparatus 200 serving as the master device is performed in Step S228 after authentication of the information processing apparatus 100 serving as the authentication device is performed in Step S226 in the above example, the present disclosure is not limited thereto. After authentication of the information processing apparatus 200 serving as the master device is performed, authentication of the information processing apparatus 100 serving as the authentication device may be performed.

[3.2. When Association is Performed in Authentication Apparatus]

Another example of the process of resuming use of the public key will be described. The following example is an exemplary operation when use of the public key is resumed without using the signature when an association between the public key PKey and the MPKey is performed in the authentication apparatus 300.

Figure 16:
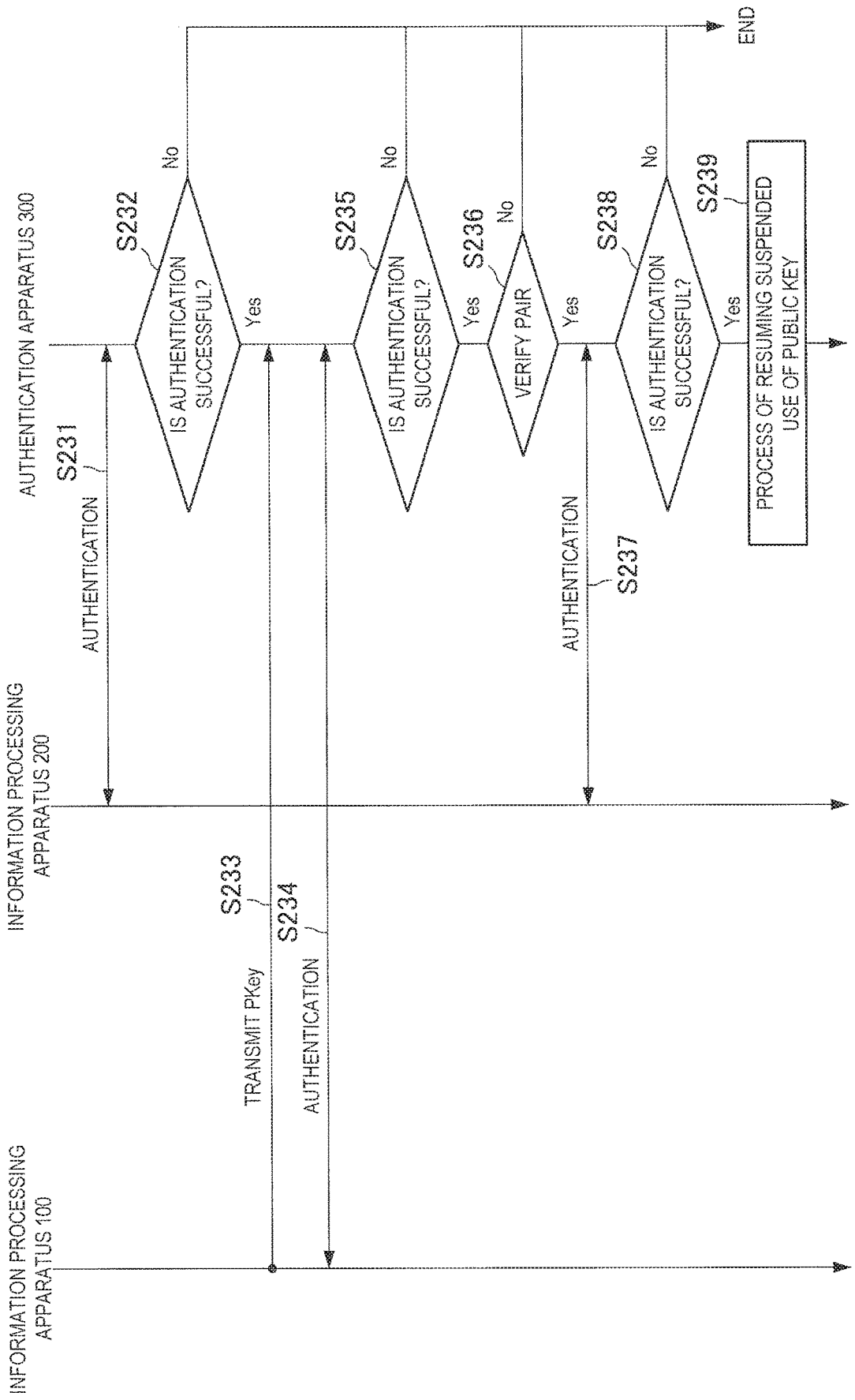
FIG. 16 is a flowchart illustrating exemplary operations of the information processing system 1 according to the second embodiment of the present disclosure.
Figure 17:
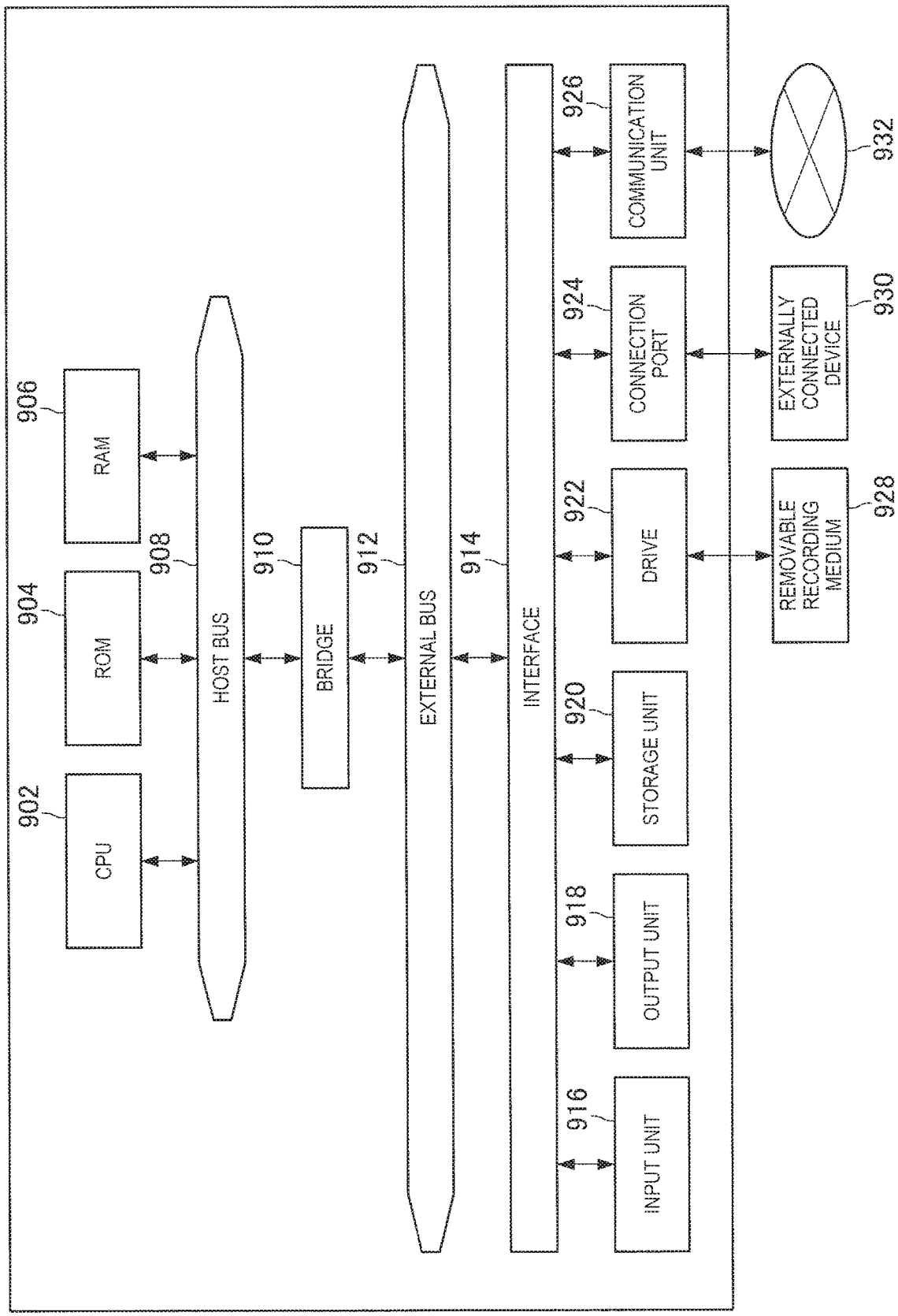
FIG. 17 is an explanatory diagram illustrating an exemplary hardware configuration.

FIG. 16 is a flowchart illustrating exemplary operations of the information processing system 1 according to the second embodiment of the present disclosure. FIG. 16 illustrates exemplary operations when the process of resuming use of the public key PKey generated by the information processing apparatus 100 is performed between the information processing apparatuses 100 and 200 and the authentication apparatus 300. The exemplary operations of the information processing system 1 according to the second embodiment of the present disclosure will be described below with reference to FIG. 16.

When the information processing apparatus 200 requests the process of resuming use of the public key PKey whose use was suspended once, first, the information processing apparatus 200 performs the authentication process with the authentication apparatus 300 according to the public key authentication scheme (Step S231). When the authentication process is performed between the information processing apparatus 200 and the authentication apparatus 300 according to the public key authentication scheme, the authentication apparatus 300 determines whether authentication of the information processing apparatus 200 is successful (Step S232).

When the authentication apparatus 300 fails to authenticate the information processing apparatus 200 (No in Step S232), the authentication apparatus 300 ends the process without performing the process of resuming use of the public key PKey. On the other hand, when the authentication apparatus 300 successfully authenticates the information processing apparatus 200 (Yes in Step S232), the information processing apparatus 100 then transmits the same public key PKey as the public key whose use is desired to be resumed in the authentication apparatus 300 to the authentication apparatus 300 (Step S233).

The authentication apparatus 300 then performs the authentication process with the information processing apparatus 100 that has generated the public key PKey whose use is to be resumed according to the public key authentication scheme (Step S234). The authentication apparatus 300 can confirm whether the secret key SKey corresponding to the public key PKey whose use is to be resumed is in the information processing apparatus 100 according to the authentication process in Step S234.

When the authentication process is performed between the information processing apparatus 100 and the authentication apparatus 300 according to the public key authentication scheme, the authentication apparatus 300 determines whether authentication of the information processing apparatus 100 is successful (Step S235). When the authentication apparatus 300 fails to authenticate the information processing apparatus 100 (No in Step S235), the authentication apparatus 300 ends the process without performing the process of resuming use of the public key PKey. On the other hand, when the authentication apparatus 300 successfully authenticates the information processing apparatus 100 (Yes in Step S235), the authentication apparatus 300 then verifies the pair of the public key PKey and the public key MPKey (Step S236).

When the authentication apparatus 300 has verified that they are not associated with each other based on the verification result of the pair of the public key PKey and the public key MPKey (No in Step S236), the authentication apparatus 300 ends the process without performing the process of resuming use of the public key PKey. On the other hand, when the authentication apparatus 300 has verified that they are associated with each other based on the verification result of the pair of the public key PKey and the public key MPKey (Yes in Step S236), the authentication apparatus 300 then performs the authentication process with the information processing apparatus 200 according to the public key authentication scheme again (Step S237). When the authentication process is performed between the information processing apparatus 200 and the authentication apparatus 300 according to the public key authentication scheme, the authentication apparatus 300 determines whether authentication of the information processing apparatus 200 is successful (Step S238).

When the authentication apparatus 300 fails to authenticate the information processing apparatus 200 (No in Step S238), the authentication apparatus 300 ends the process without performing the process of resuming use of the public key PKey. On the other hand, when the authentication apparatus 300 successfully authenticates the information processing apparatus 200 (Yes in Step S238), the authentication apparatus 300 performs the process of resuming use of the public key PKey that was suspended once (Step S239). As the process of resuming use of the public key PKey that was suspended once, the authentication apparatus 300 performs, for example, the process of deleting the flag indicating the use suspension state of the public key PKey from the storage unit 330, or the process of moving the public key PKey from the predetermined use suspension list.

When the information processing apparatuses 100 and 200 and the authentication apparatus 300 perform such operations, it is possible to resume use of the public key that is generated in the information processing apparatus 100 and whose use was suspended once in the authentication apparatus 300. When use of the public key generated in the information processing apparatus 100 is resumed, the user need not perform a process of regenerating a key when the lost information processing apparatus 100 is found or a process of registering the regenerated public key in the authentication apparatus 300.

<4. Exemplary Hardware Configuration>

Each algorithm described above can be performed by using, for example, the hardware configuration of the information processing apparatus shown in FIG. 15. That is, processing of each algorithm can be realized by controlling the hardware shown in FIG. 15 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 15, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is a storing mechanism, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

For example, when the information processing apparatus 100 has such a hardware configuration, functions of the key generation unit 115 and the control unit 120 may performed by, for example, the CPU 902. In addition, a function of the storage unit 130 may be performed by, for example, the ROM 904, the RAM 906, the storage unit 920, or the removable recording medium 928. In addition, for example, functions of the transceiving unit 110 or the antenna 140 may be performed by the communication unit 926.

In addition, when the information processing apparatus 200 has such a hardware configuration, functions of the key generation unit 215 and the control unit 220 may be performed by, for example, the CPU 902. In addition, a function of the output unit 225 may be performed by, for example, the output unit 918. In addition, a function of the storage unit 230 may be performed by, for example, the ROM 904, the RAM 906, the storage unit 920, or the removable recording medium 928. In addition, a function of the transceiving unit 210 or the antenna 240 may be performed by, for example, the communication unit 926.

In addition, when the authentication apparatus 300 has such a hardware configuration, a function of the control unit 320 may be performed by, for example, the CPU 902. In addition, a function of the storage unit 330 may be performed by, for example, the ROM 904, the RAM 906, the storage unit 920, or the removable recording medium 928. In addition, a function of the transceiving unit 310 or the antenna 340 may be performed by, for example, the communication unit 926.

<5. Conclusion>

As described above, according to embodiments of the present disclosure, there are provided the information processing apparatuses 100 and 200 and the authentication apparatus 300 that use the public key authentication scheme to implement a user authentication mechanism more safely and conveniently than existing techniques. In the embodiments of the present disclosure, when the authentication process is performed between the information processing apparatuses 100 and 200 and the authentication apparatus 300 according to the public key authentication scheme, it is possible to ensure robust security.

In the first embodiment of the present disclosure, in the information processing apparatus 200 serving as the master device, the public key PKey generated by the information processing apparatus 100 serving as the authentication device is associated with the MPKey generated by the information processing apparatus 200. Therefore, in the first embodiment of the present disclosure, when the user is unable to perform the authentication process with the authentication apparatus 300 using the information processing apparatus 100 because she or he has lost the information processing apparatus 100, the information processing apparatus 200 serving as the master device requests suspension of use of the public key PKey from the authentication apparatus 300.

In addition, in the second embodiment of the present disclosure, in the authentication apparatus 300, the public key PKey generated by the information processing apparatus 100 and the MPKey generated by the information processing apparatus 200 are associated. Therefore, in the second embodiment of the present disclosure, when the user is unable to perform the authentication process with the authentication apparatus 300 using the information processing apparatus 100 because she or he has lost the information processing apparatus 100, the information processing apparatus 200 serving as the master device requests suspension of use of the public key PKey from the authentication apparatus 300.

In this manner, when an apparatus for requesting suspension of use of the public key PKey generated by the information processing apparatus 100 is provided separately from the information processing apparatus 100, it is possible to minimize a risk when the information processing apparatus 100 is lost in the embodiments of the present disclosure. In addition, as described in embodiments of the present disclosure, when the apparatus for requesting suspension of use of the public key PKey generated by the information processing apparatus 100 is provided separately from the information processing apparatus 100, it is possible for the user or another user on whom the user can rely to easily suspend use of the public key PKey of the information processing apparatus 100 by hand. Since the user or another user on whom the user can rely can easily suspend use of the public key PKey of the information processing apparatus 100 by hand, the information processing system 1 according to the present embodiment can reduce an operation cost of the system.

In the first embodiment of the present disclosure, when the public key PKey generated by the information processing apparatus 100 is associated with the MPKey generated by the information processing apparatus 200, a signature is generated in the information processing apparatus 100 and transmitted to the information processing apparatus 200. In this manner, when a right to handle the public key PKey is transferred from the information processing apparatus 100 to the information processing apparatus 200, even if the user of the information processing apparatus 100 is unable to immediately use the information processing apparatus 200 since she or he has lost the information processing apparatus 100, the user of the information processing apparatus 200 can disable the public key PKey on her or his behalf. The user of the information processing apparatus 200 is a user on whom the user of the information processing apparatus 100 can rely. When the information processing apparatus 100 is lost, an operation is more efficient when disabling is left up to the user of the information processing apparatus 200 than when a query is issued to an operator.

In the above embodiments, when the public key PKey generated by the information processing apparatus 100 is disabled, if there are a plurality of public keys associated with the MPKey generated by the information processing apparatus 200, the information processing apparatus 200 outputs the user interface configured for the user to select a public key to be disabled. When an alternative is presented to the user, an authentication system according to the above embodiment enables flexible key management. In addition, in the first embodiment, in the information processing apparatus 200 serving as the master device, when the public key PKey generated by the information processing apparatus 100 is associated with the MPKey generated by the information processing apparatus 200, it is possible to suppress an influence on the storage area of the authentication apparatus 300.

In the above embodiments, as the use suspension process of the public key PKey, the authentication apparatus 300 performs, for example, a process of deleting the public key PKey from the storage unit 330, setting a flag indicating the use suspension state of the public key PKey in the storage unit 330, or moving the public key PKey to the predetermined use suspension list. Here, when the public key PKey is set with the flag or moved to the predetermined use suspension list, if there is an attempt to use the public key PKey, the authentication apparatus 300 can detect that the attempt has occurred and record that the attempt has occurred.

In the above embodiments, it is possible to associate the public key PKey generated by the information processing apparatus 100 with the MPKey generated by the information processing apparatus 200 in advance at the time of factory shipping. When the public keys are associated with each other in advance at the time of factory shipping, the user has no need to perform the association operation.

In addition, according to the embodiments of the present disclosure, the public key PKey of the information processing apparatus 100 whose use was suspended once can be set to an available state again. When the public key PKey of the information processing apparatus 100 is changed to an available state again, the authentication apparatus 300 authenticates not only the information processing apparatus 200 serving as the master device but also the information processing apparatus 100 serving as the authentication device. Therefore, it is possible to determine whether the public key PKey of the information processing apparatus 100 should be changed to the available state again.

The steps in the processes performed by each apparatus in the present specification may not necessarily be processed chronologically in the orders described in the sequence diagrams and the flowcharts. For example, the steps in the processes performed by each apparatus may be processed in different orders from the orders described in the flowcharts or may be processed in parallel.

In addition, it is possible to implement a computer program causing hardware such as a CPU, a ROM and a RAM installed in each apparatus to execute the same functions as those of the configuration of each apparatus described above. In addition, it is possible to provide a storage medium in which the computer program is stored. The present technology can also be performed by distributing software (app) from an application software distribution server to an information processing apparatus such as a smartphone or a tablet and installing the distributed software (app) in the information processing apparatus. The application software distribution server includes a network interface configured to distribute the software (app) to the information processing apparatus and a storage device configured to store the software (app). In addition, when functional blocks shown in the functional block diagram are configured as hardware, it is possible to implement a series of processes in hardware.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:

a memory configured to retain a first secret key corresponding to a first public key; and a processor configured to request a change of a usage state of a second public key registered by a second apparatus in a first apparatus configured to retain a public key corresponding to a secret key from the first apparatus according to authentication using the first public key associated with the second public key and the first secret key.

(2)

The information processing apparatus according to (1), wherein the processor receives the second public key and signature information generated using a second secret key corresponding to the second public key from the second apparatus, and associates the first public key with the second public key.

(3)

The information processing apparatus according to (2), wherein the processor, when requesting the change of the usage state of the second public key, transmits the second public key and the signature information to the first apparatus.

(4)

The information processing apparatus according to any of (1) to (3), wherein the processor causes a display unit to display an interface configured for a user to select the second public key whose usage state is to be changed.

(5)

The information processing apparatus according to any of (1) to (4), wherein the processor issues a request to change the usage state of the second public key from an available state to a disabled state to the first apparatus.

(6)

The information processing apparatus according to any of (1) to (4), wherein the processor issues a request to change the usage state of the second public key from a disabled state to an available state to the first apparatus.

(7)

An information processing apparatus including:

a memory configured to retain at least a public key out of a pair of a secret key and the public key generated in a first apparatus and a second apparatus; and a processor configured to retain a first public key generated in the first apparatus in the memory in association with a second public key generated in the second apparatus, and change a usage state of the second public key in response to a request to change the usage state of the second public key from the first apparatus.

(8)

The information processing apparatus according to (7), wherein, after authentication of the first apparatus according to the first public key is performed, the processor receives the second public key and then associates the second public key with the first public key.

(9)

The information processing apparatus according to (8), wherein, after the second public key is received, the processor authenticates the first apparatus again according to the first public key.

(10)

The information processing apparatus according to any of (7) to (9), wherein, when a request to change the usage state of the second public key is received from the first apparatus, the processor authenticates the first apparatus according to the first public key and then changes the usage state of the second public key.

(11)

The information processing apparatus according to any of (7) to (10), wherein the processor changes the usage state of the second public key from an available state to a disabled state in response to reception of a request to change the usage state of the second public key from an available state to a disabled state.

(12)

The information processing apparatus according to any of (7) to (12), wherein the processor changes the usage state of the second public key from a disabled state to an available state in response to reception of a request to change the usage state of the second public key from a disabled state to an available state.

(13)

An information processing method including the steps of:

retaining a first secret key corresponding to a first public key; and requesting a change of a usage state of a second public key registered by a second apparatus in a first apparatus configured to retain a public key corresponding to a secret key from the first apparatus according to authentication using the first public key associated with the second public key and the first secret key.

(14)

An information processing method including the steps of:
retaining at least a public key out of a pair of a secret key and the public key generated in a first apparatus and a second apparatus;
retaining a first public key generated in the first apparatus in association with a second public key generated in the second apparatus; and
changing a usage state of the second public key in response to a request to change the usage state of the second public key from the first apparatus.

(15)

A computer program causing a computer to execute the steps of:
retaining a first secret key corresponding to a first public key; and
requesting a change of a usage state of a second public key registered by a second apparatus in a first apparatus configured to retain a public key corresponding to a secret key from the first apparatus according to authentication using the first public key associated with the second public key and the first secret key.

(16)

A computer program causing a computer to execute the steps of:
retaining at least a public key out of a pair of a secret key and the public key generated in a first apparatus and a second apparatus;
retaining a first public key generated in the first apparatus in association with a second public key generated in the second apparatus; and
changing a usage state of the second public key in response to a request to change the usage state of the second public key from the first apparatus.

REFERENCE SIGNS LIST 1 information processing system
100, 200 information processing apparatus
300 authentication apparatus

The invention claimed is:

1. An information processing apparatus, comprising:
a memory configured to retain a first secret key corresponding to a first public key, wherein each of the first secret key and the first public key corresponds to the information processing apparatus; and
one or more processors configured to:
generate the first public key and the first secret key;
transmit the first public key to a first apparatus;
receive, a second public key and the first public key attached with signature information from the first apparatus, based on the transmitted first public key, wherein the second public key is associated with the first public key based on the signature information; and
request a second apparatus to change a usage state of the second public key, wherein
the request is transmitted to the second apparatus based on each of authentication of the information processing apparatus by the second apparatus and the association of the second public key with the first public key,
the second apparatus authenticates the information processing apparatus based on the first public key, and
the second public key is registered by the first apparatus in the second apparatus.

2. The information processing apparatus according to claim 1, wherein
the first apparatus generates the signature information based on a second secret key, and
the second secret key corresponds to the first apparatus.

3. The information processing apparatus according to claim 2, wherein the one or more processors are further configured to transmit the second public key and the signature information to the second apparatus.

4. The information processing apparatus according to claim 1, further comprising a display unit configured to display a user interface for a selection of the second public key.

5. The information processing apparatus according to claim 1, wherein the one or more processors are further configured to request the second apparatus to change the usage state of the second public key from an available state to a disabled state.

6. The information processing apparatus according to claim 1, wherein the one or more processors are further configured to request the second apparatus to change the usage state of the second public key from a disabled state to an available state.

7. An information processing apparatus, comprising:
a memory configured to retain at least a public key of at least one of a first apparatus or a second apparatus; and
one or more processors configured to:
associate a first public key generated in the first apparatus with a second public key generated in the second apparatus,
wherein the memory is further configured to retain the second public key and the first public key;
receive a request from the first apparatus to change a usage state of the second public key, wherein
the first public key is transmitted from the first apparatus to the second apparatus, and
the second public key and the first public key attached with signature information are transmitted, by the second apparatus to the first apparatus, based on the transmitted first public key;
authenticate the first apparatus based on the first public key and the received request; and
change the usage state of the second public key based on the authentication of the first apparatus and the association of the second public key with the first public key.

8. The information processing apparatus according to claim 7, wherein the one or more processors are further configured to
receive the second public key from the second apparatus based on the authentication.

9. The information processing apparatus according to claim 8, wherein the one or more processors are further configured to authenticate the first apparatus based on the received second public key.

10. The information processing apparatus according to claim 7, wherein the one or more processors are further configured to change the usage state of the second public key from an available state to a disabled state.

11. The information processing apparatus according to claim 7, wherein the one or more processors are further configured to change the usage state of the second public key from a disabled state to an available state.

12. The information processing apparatus according to claim 7, wherein the one or more processors are further configured to:

receive the second public key and the signature information from the first apparatus; and verify the received signature information based on the received second public key retained in the memory.

13. The information processing apparatus according to claim 12, wherein the one or more processors are further configured to change the usage state of the second public key based on the verification of the signature information.

14. An information processing method, comprising:

in an information processing apparatus:

generating a first public key and a first secret key,
wherein each of the first secret key and the first public key corresponds to the information processing apparatus;

retaining the first secret key corresponding to the first public key;

transmitting the first public key to a first apparatus;

receiving, a second public key and the first public key attached with signature information from the first apparatus, based on the transmitted first public key, wherein the second public key is associated with the first public key based on the signature information; and requesting a second apparatus to change a usage state of the second public key, wherein
the request is transmitted to the second apparatus based on each of authentication of the information processing apparatus by the second apparatus, and the association of the second public key with the first public key, the second apparatus authenticates the information processing apparatus based on the first public key, and the second public key is registered by the first apparatus in the second apparatus.

15. An information processing method, comprising:

in an information processing apparatus:

retaining at least a public key of at least one of a first apparatus or a second apparatus;

associating a first public key generated in the first apparatus with a second public key generated in the second apparatus;

retaining the second public key and the first public key;

receiving a request from the first apparatus to change a usage state of the second public key, wherein
the first public key is transmitted from the first apparatus to the second apparatus, and the second public key and the first public key attached with signature information are transmitted, by the second apparatus to the first apparatus, based on the transmitted first public key;

authenticating the first apparatus based on the first public key and the received request; and changing the usage state of the second public key based on the authentication of the first apparatus and the association of the second public key with the first public key.

16. A non-transitory computer-readable medium having stored thereon, computer-readable instructions, which when executed by a computer, cause the computer to execute operations, the operations comprising:

generating a first public key and a first secret key,
wherein each of the first secret key and the first public key corresponds to an information processing apparatus;

retaining the first secret key corresponding to the first public key;

transmitting the first public key to a first apparatus;

receiving, a second public key and the first public key attached with signature information from the first apparatus, based on the transmitted first public key, wherein the second public key is associated with the first public key based on the signature information; and requesting a second apparatus to change a usage state of the second public key, wherein
the request is transmitted to the second apparatus based on each of authentication of the information processing apparatus by the second apparatus, and the association of the second public key with the first public key, the second apparatus authenticates the information processing apparatus based on the first public key, and the second public key is registered by the first apparatus in the second apparatus.

17. A non-transitory computer-readable medium having stored thereon, computer-readable instructions, which when executed by a computer, cause the computer to execute operations, the operations comprising:

retaining at least a public key of at least one of a first apparatus or a second apparatus;

associating a first public key generated in the first apparatus with a second public key generated in the second apparatus;

retaining the second public key and the first public key;

receiving a request from the first apparatus to change a usage state of the second public key, wherein
the first public key is transmitted from the first apparatus to the second apparatus, and the second public key and the first public key attached with signature information is transmitted, by the second apparatus to the first apparatus, based on the transmitted first public key;

authenticating the first apparatus based on the first public key and the received request; and changing the usage state of the second public key based on the authentication of the first apparatus and the association of the second public key with the first public key.

* * * * *